United States Patent
Seaton et al.

(10) Patent No.: US 9,402,364 B2
(45) Date of Patent: Aug. 2, 2016

(54) ROBOT MILKING ARM AND A METHOD OF ATTACHING MILKING CUPS

(71) Applicant: Scott Milktech Limited, Dunedin (NZ)

(72) Inventors: Mark Hamish Seaton, Dunedin (NZ); Thomas Glover, Christchurch (NZ); Bryan Gordon Grimshaw, Christchurch (NZ); Matthew Iain McKenzie, Dunedin (NZ)

(73) Assignee: Scott Milktech Limited (NZ)

( * ) Notice: Subject to any disclaimer, the term of this patent is extended or adjusted under 35 U.S.C. 154(b) by 131 days.

(21) Appl. No.: 14/181,127

(22) Filed: Feb. 14, 2014

(65) Prior Publication Data

US 2014/0165917 A1 Jun. 19, 2014

Related U.S. Application Data

(63) Continuation-in-part of application No. 12/921,750, filed as application No. PCT/NZ2009/000036 on Mar. 11, 2009, now Pat. No. 8,670,867.

(30) Foreign Application Priority Data

Mar. 11, 2008 (NZ) ........................................ 566631

(51) Int. Cl.
*A01J 3/00* (2006.01)
*A01J 5/00* (2006.01)
*A01J 5/017* (2006.01)

(52) U.S. Cl.
CPC ..................................... *A01J 5/0175* (2013.01)

(58) Field of Classification Search
USPC ............ 119/14.11, 14.1, 14.03, 14.02, 14.04, 119/14.08; 901/9, 2, 14, 15, 23; 700/245
See application file for complete search history.

(56) References Cited

U.S. PATENT DOCUMENTS

| | | | |
|---|---|---|---|
| 3,690,300 A | 9/1972 | Tonelli | |
| 4,508,058 A | 4/1985 | Jakobson et al. | |
| 4,941,433 A | 7/1990 | Hanauer | |
| 5,042,428 A | 8/1991 | van der Lely et al. | |
| 5,606,932 A * | 3/1997 | van der Lely ........... | A01J 5/007 119/14.14 |
| 5,634,428 A | 6/1997 | Koster | |
| 5,697,324 A * | 12/1997 | van der Lely ........... | A01J 5/007 119/14.08 |
| 5,706,758 A * | 1/1998 | Street ..................... | A01J 5/0175 119/14.08 |
| 5,769,025 A | 6/1998 | van der Lely et al. | |
| 5,778,820 A | 7/1998 | van der Lely et al. | |
| 5,909,716 A | 6/1999 | van der Lely | |
| 5,934,220 A | 8/1999 | Hall et al. | |
| 5,937,786 A * | 8/1999 | Peacock ................. | A01J 5/017 119/14.11 |
| 5,950,561 A | 9/1999 | Redmond et al. | |
| 5,950,562 A | 9/1999 | Schulte et al. | |

(Continued)

FOREIGN PATENT DOCUMENTS

DE 10351549 A1 6/2005
EP 0091892 A2 10/1983

(Continued)

*Primary Examiner* — Ronnie Mancho
(74) *Attorney, Agent, or Firm* — KPPB LLP

(57) ABSTRACT

A robotic milking system suitable for use with conventional milking clusters. Clusters are withdrawn to a generally known position upon release from a cow with the cups hanging down below the bowl. The cups are then located in a confined region from where they are picked up by a robotic arm and attached to teats of a cow. The arrangement allows a single robotic arm to service multiple bales of a rotary milking parlor.

22 Claims, 21 Drawing Sheets

(56) References Cited

U.S. PATENT DOCUMENTS

| | | | |
|---|---|---|---|
| 6,044,793 | A | 4/2000 | van der Lely |
| 6,116,188 | A | 9/2000 | van der Lely |
| 6,213,051 | B1 | 4/2001 | Fransen |
| 6,279,507 | B1 | 8/2001 | van der Lely et al. |
| 6,401,654 | B1 * | 6/2002 | Hallsten ............ A01J 7/025 119/14.18 |
| 6,697,821 | B2 | 2/2004 | Ziff et al. |
| 6,948,449 | B2 | 9/2005 | Van der Lingen et al. |
| 7,334,537 | B2 | 2/2008 | Van Den Berg et al. |
| 2002/0033138 | A1 | 3/2002 | Brayer |
| 2004/0168645 | A1 | 9/2004 | Deelstra |
| 2006/0196432 | A1 | 9/2006 | Peacock |
| 2007/0277737 | A1 * | 12/2007 | Maier ............... A01J 5/007 119/14.45 |
| 2008/0022933 | A1 * | 1/2008 | Wase ............... A01J 5/0175 119/14.08 |
| 2010/0058990 | A1 * | 3/2010 | Danneker ......... A01J 5/0175 119/14.47 |
| 2010/0289649 | A1 * | 11/2010 | Holmgren ......... A01J 5/0175 340/573.3 |
| 2011/0061596 | A1 * | 3/2011 | Nilsson ............ A01J 5/0175 119/14.08 |
| 2011/0087372 | A1 | 4/2011 | Seaton et al. |
| 2011/0155067 | A1 * | 6/2011 | Berg ................. A01J 5/08 119/14.08 |
| 2011/0226183 | A1 * | 9/2011 | Hallstrom ......... A01J 5/0175 119/14.02 |
| 2011/0226184 | A1 * | 9/2011 | Axelsson .......... A01J 5/0175 119/14.45 |
| 2012/0055408 | A1 * | 3/2012 | Van Der Sluis ... A01K 1/126 119/14.08 |
| 2012/0272915 | A1 * | 11/2012 | Hofman ............ A01J 5/00 119/14.08 |
| 2012/0275894 | A1 * | 11/2012 | Hofman ............ A01J 5/0175 414/730 |

FOREIGN PATENT DOCUMENTS

| | | |
|---|---|---|
| EP | 0300115 B1 | 1/1988 |
| EP | 0306579 B1 | 1/1992 |
| EP | 0349019 B1 | 1/1993 |
| EP | 0689761 A1 | 1/1996 |
| EP | 0900522 A1 | 3/1999 |
| EP | 0258938 B2 | 9/1999 |
| EP | 0611004 B1 | 1/2000 |
| EP | 0689762 B2 | 8/2000 |
| EP | 0689761 B1 | 10/2000 |
| EP | 0643909 B1 | 12/2000 |
| EP | 0880888 B1 | 9/2002 |
| EP | 0973377 B1 | 11/2002 |
| EP | 0900000 B1 | 7/2003 |
| EP | 1447001 A1 | 8/2004 |
| EP | 1172030 B1 | 9/2004 |
| EP | 1166625 B1 | 11/2005 |
| EP | 1279327 B1 | 5/2007 |
| EP | 1537774 B1 | 5/2007 |
| EP | 0688162 B2 | 1/2008 |
| JP | 2000-4703 | 1/2000 |
| NZ | 229131 A | 6/1991 |
| NZ | 512411 A | 12/2002 |
| WO | 9963807 A1 | 12/1999 |
| WO | 9966786 A1 | 12/1999 |
| WO | 0072664 A1 | 12/2000 |
| WO | 0172116 A1 | 10/2001 |
| WO | 02-15676 A1 | 2/2002 |
| WO | 2004062352 A1 | 7/2004 |
| WO | 2005015985 A3 | 5/2005 |
| WO | 2005122753 A1 | 12/2005 |
| WO | 2008104416 A1 | 9/2008 |
| WO | 2008118068 A1 | 10/2008 |
| WO | 2008118069 A1 | 10/2008 |

* cited by examiner

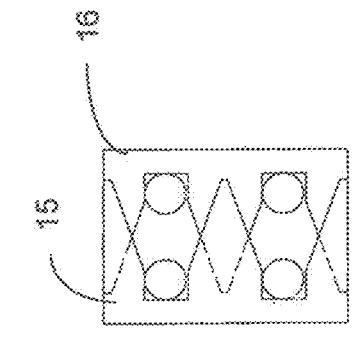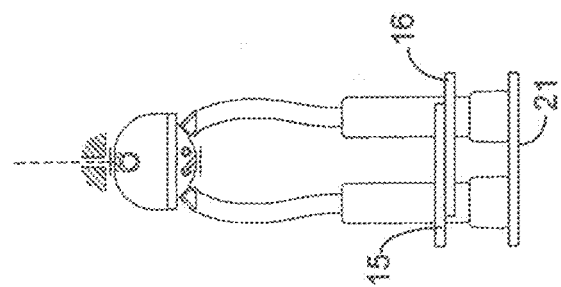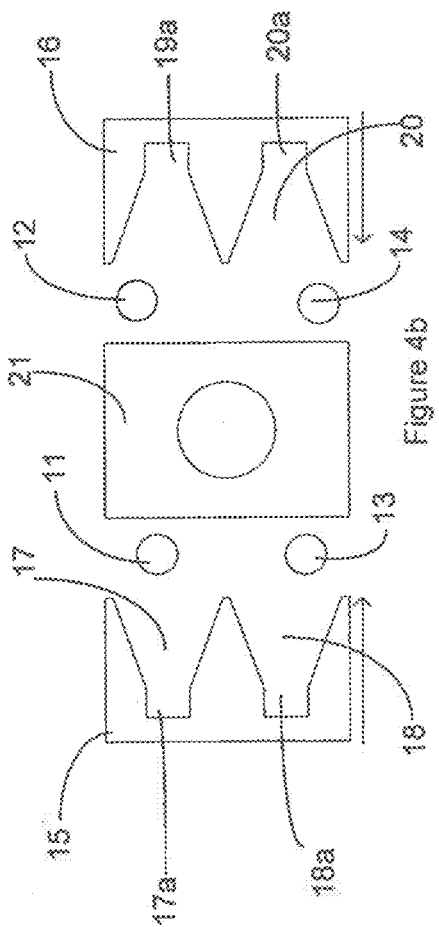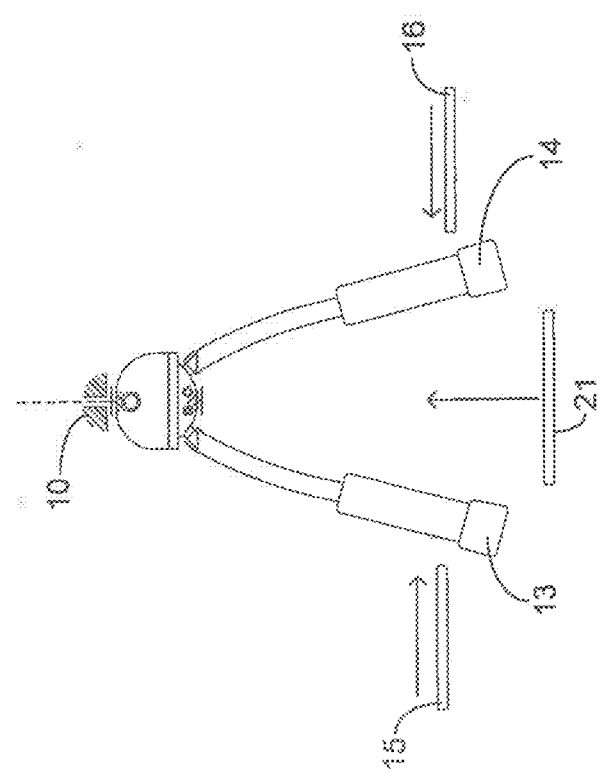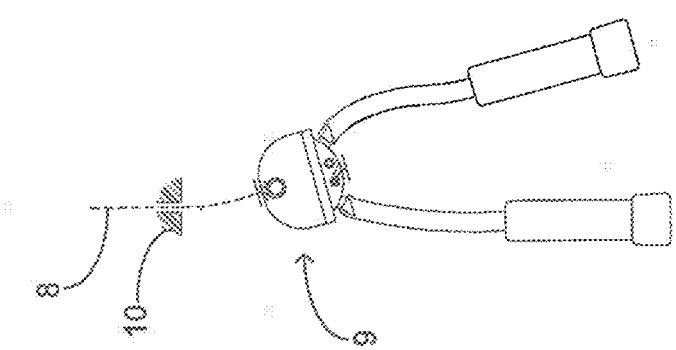

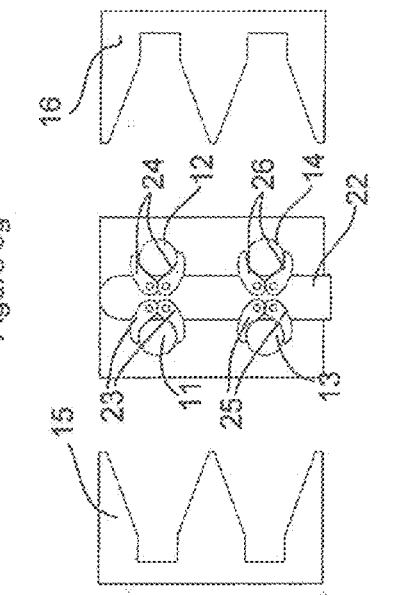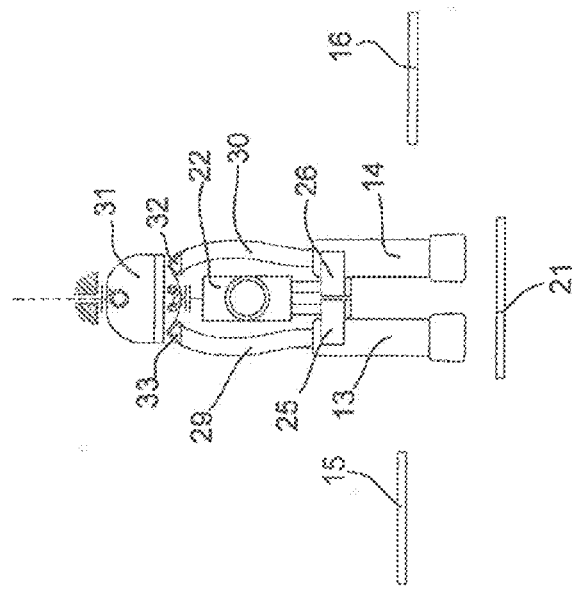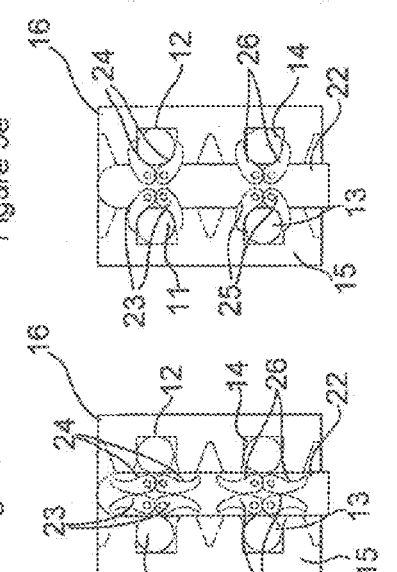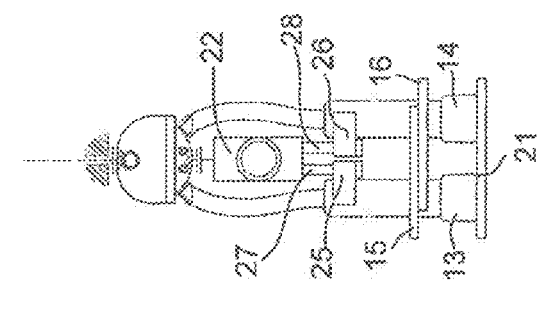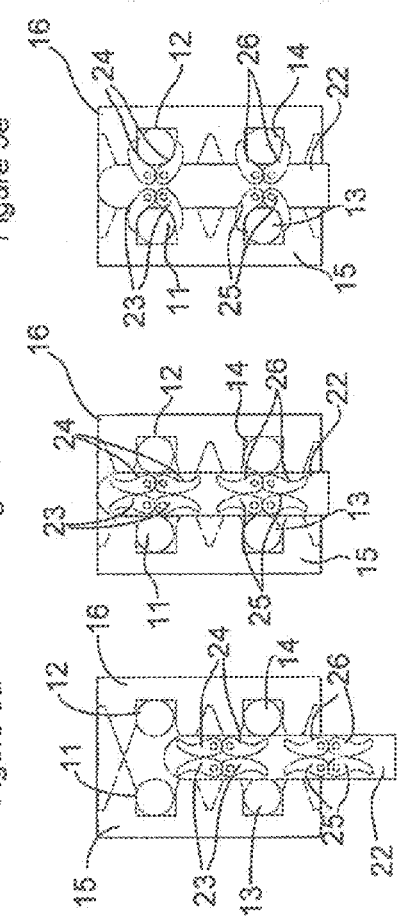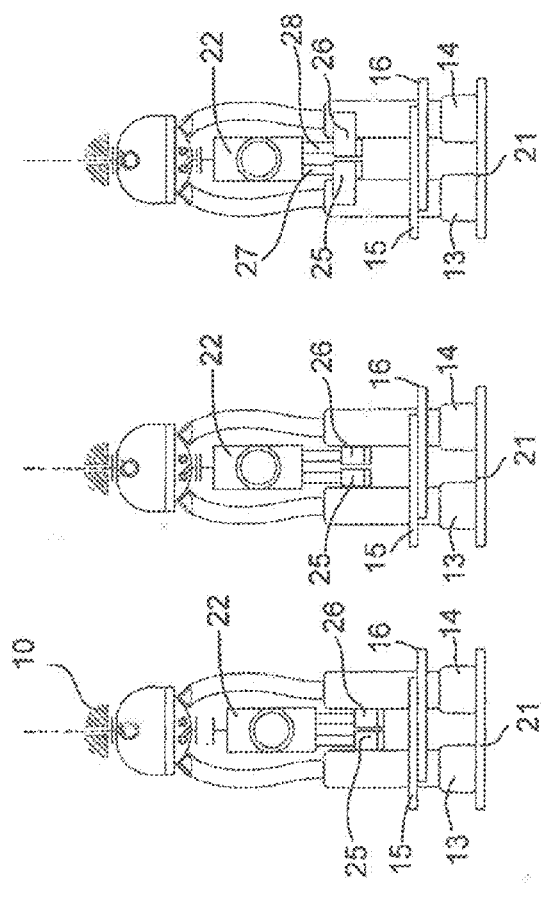

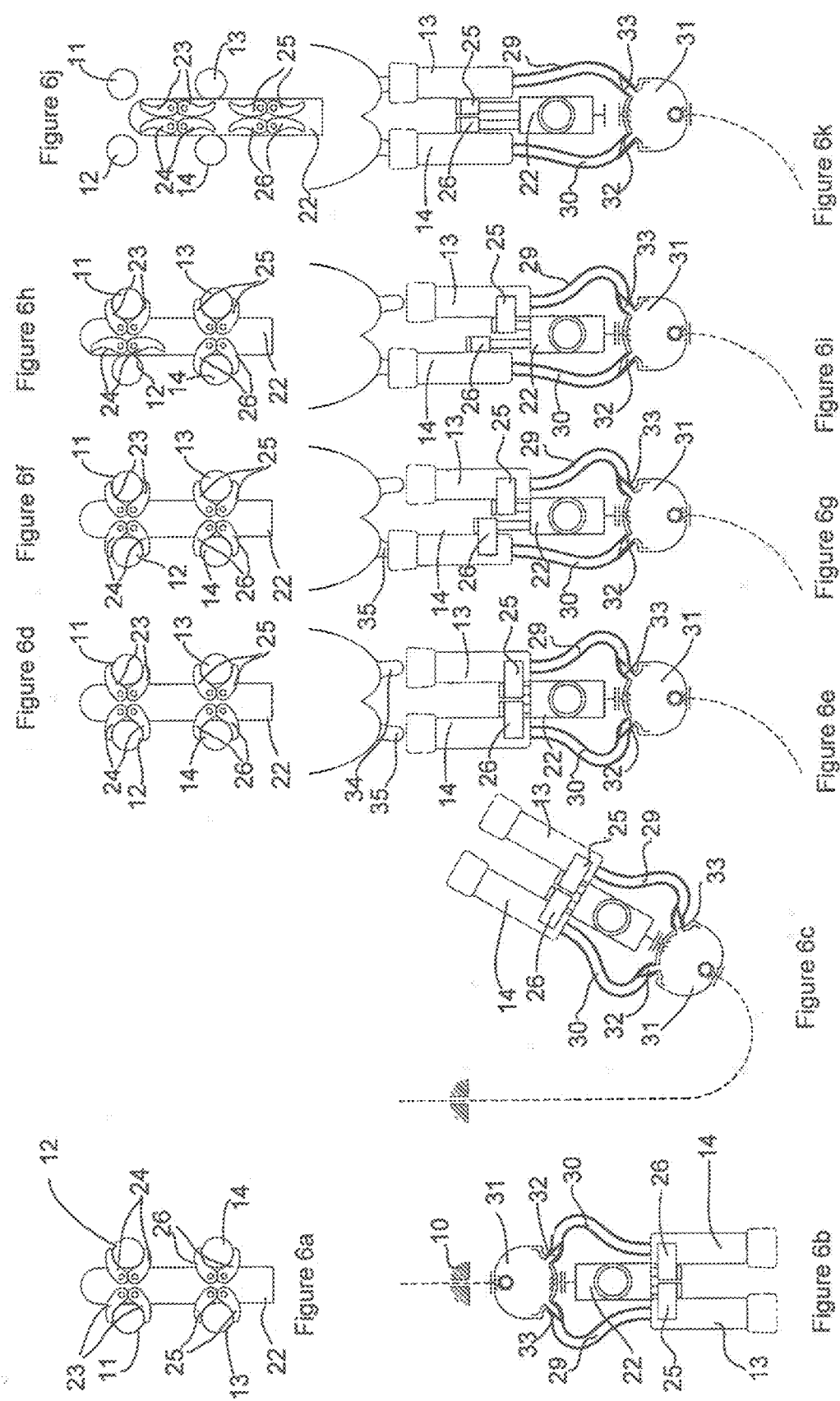

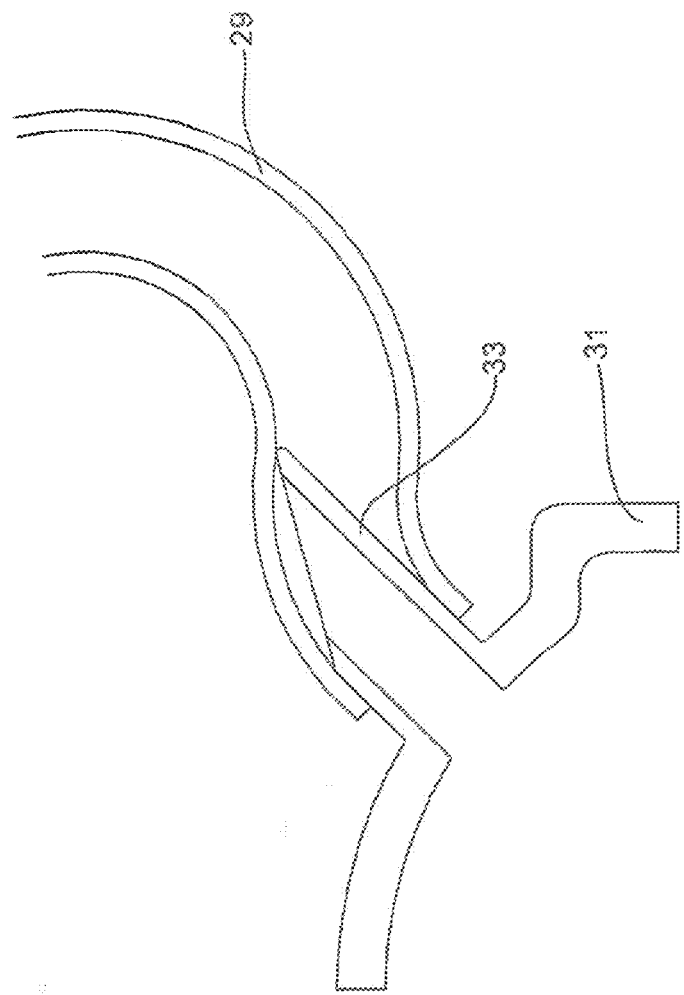
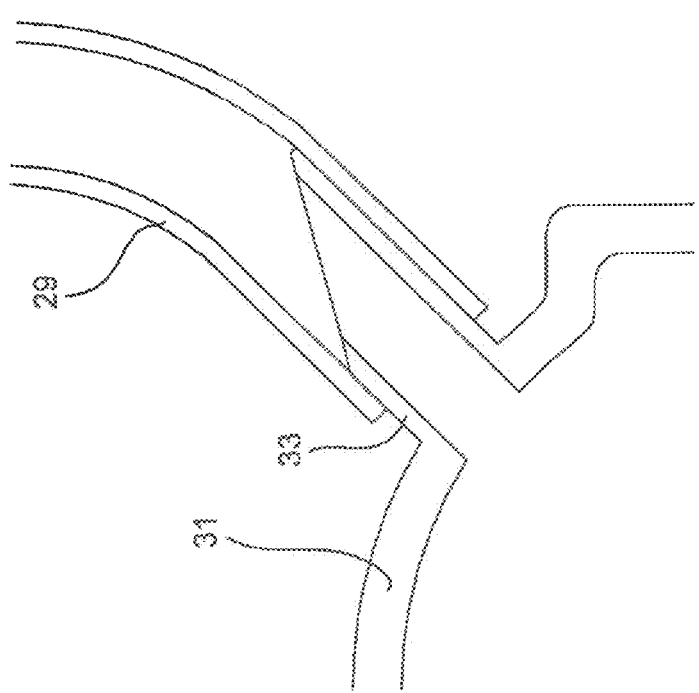

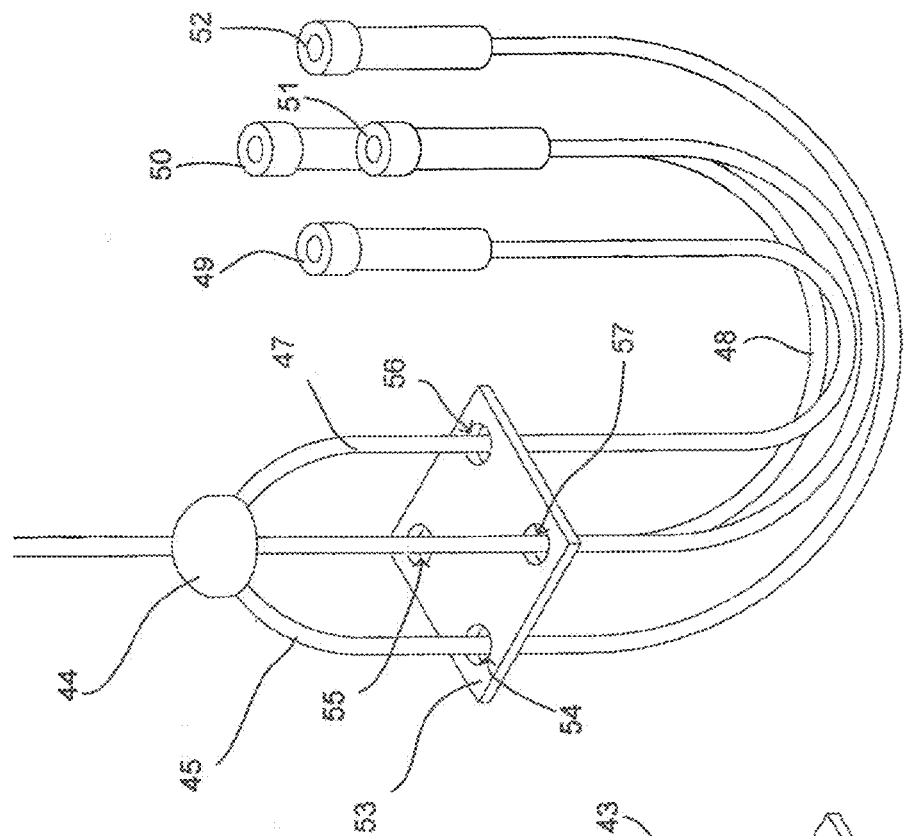
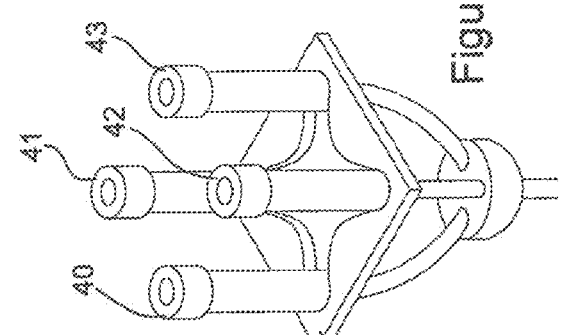
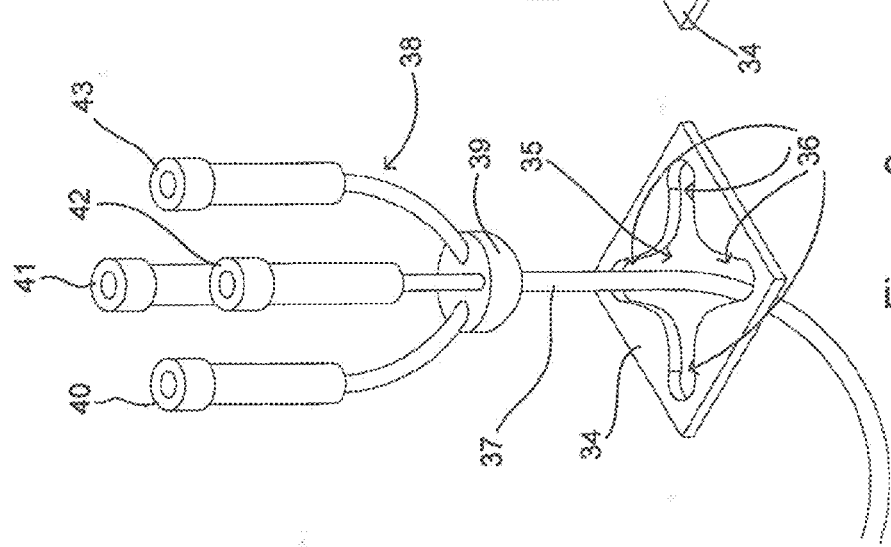

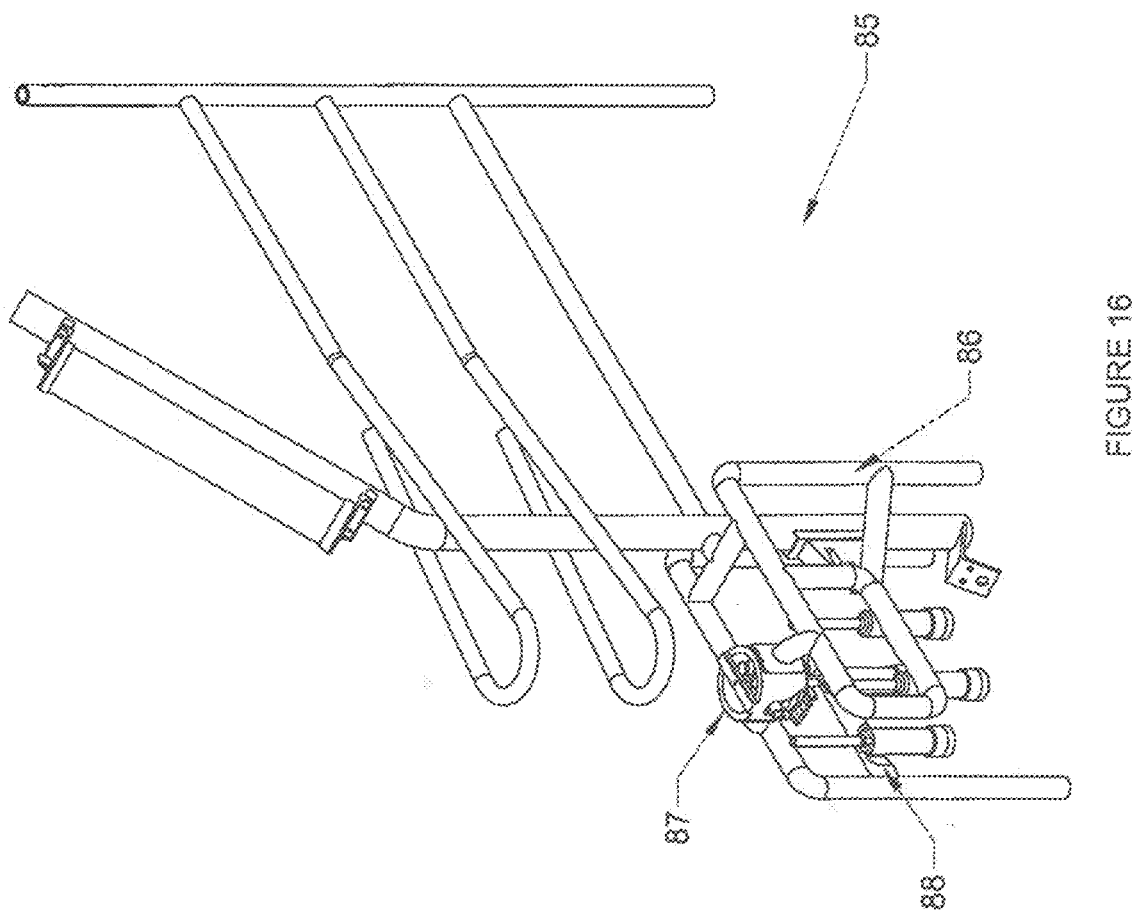

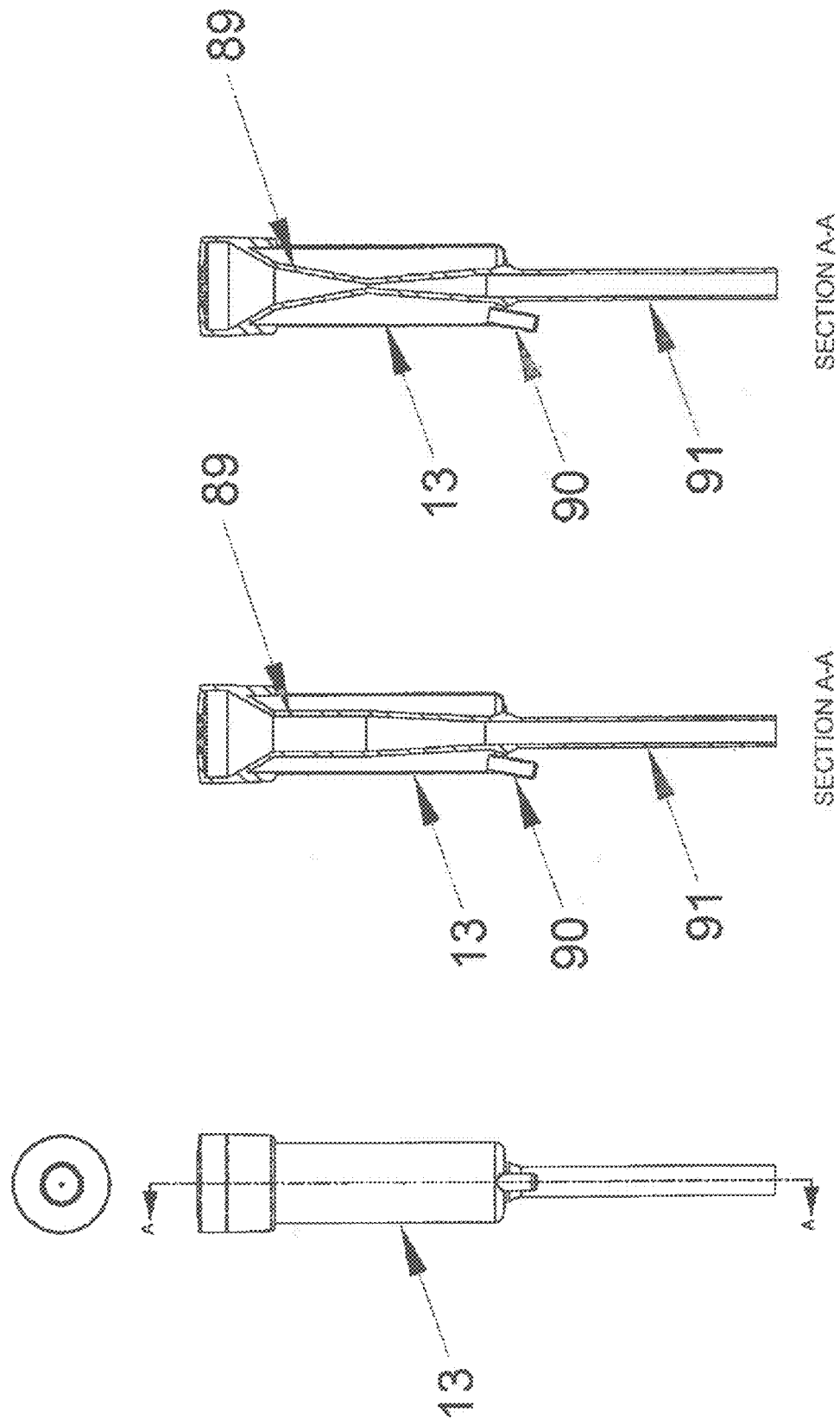

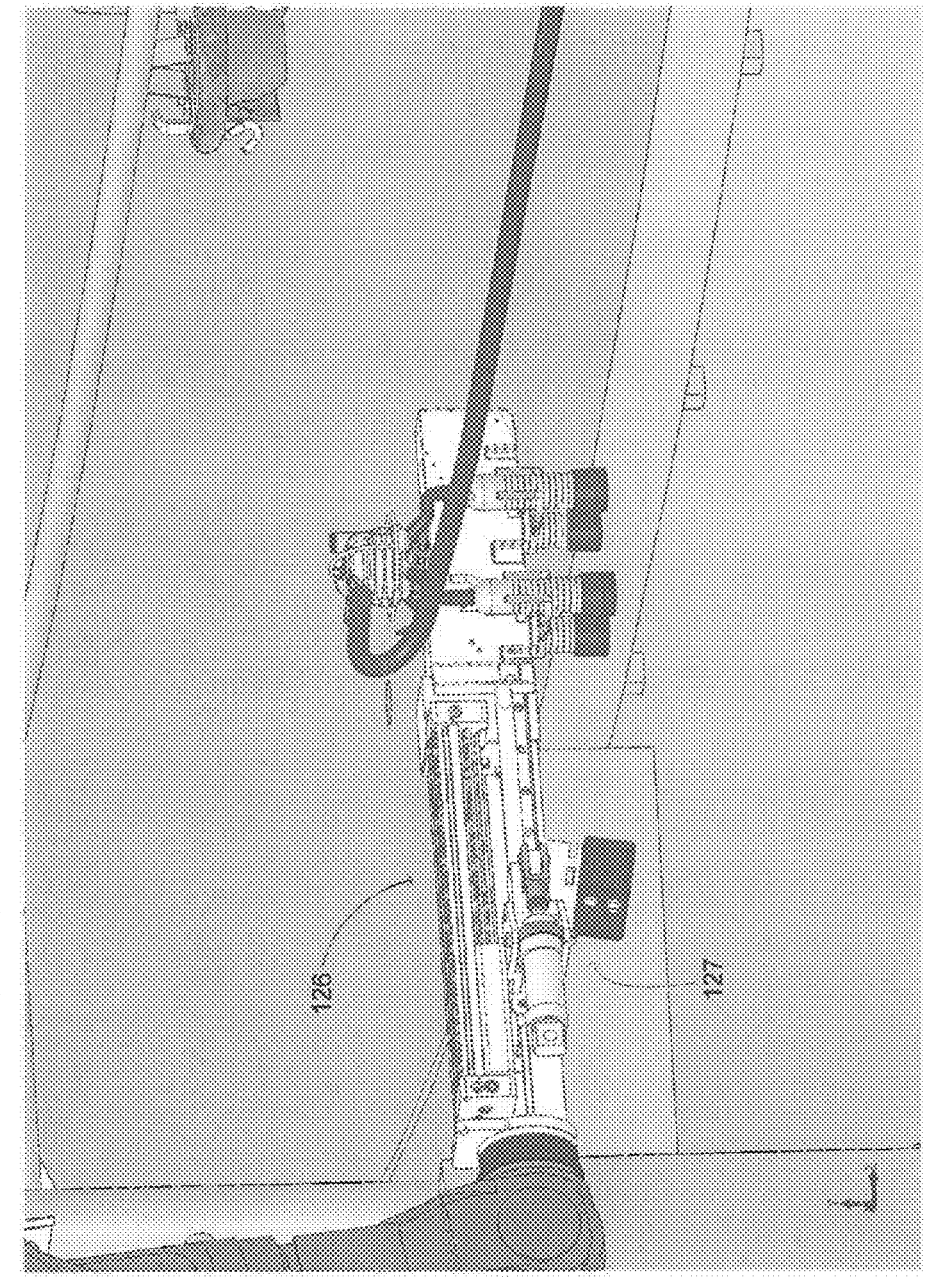

ROBOT MILKING ARM AND A METHOD OF ATTACHING MILKING CUPS

RELATED APPLICATIONS

This application is a continuation-in-part application of U.S. patent application Ser. No. 12/921,750, filed Dec. 7, 2010 that claims priority to PCT Application Serial No. PCT/NZ2009/000036 filed Mar. 9, 2009 that claims priority to New Zealand Application 566631 filed Mar. 11, 2008, the disclosures of which are hereby incorporated by reference in their entirety.

FIELD OF THE INVENTION

This invention relates to a robotic milking system and a method of attaching milking cups to the teats of an animal to be milked, particularly cows. It also relates to a milking parlour incorporating such a milking system.

BACKGROUND OF THE INVENTION

Manual and semi-automated animal milking systems are in widespread use. The predominant system currently used employs a "standard milking cluster" including a bowl (such as the Waikato 320 Claw supplied by Waikato Milking Systems of Waikato, New Zealand) connected to milking cups via feed lines. Such systems require an operator to attach and remove the cups.

A number of milking robot designs are in commercial use, such as the Lely ASTRONAUT range. Such milking robots typically service only a single animal at a time. Due to throughput limitations this requires several expensive robots to be employed or requires milking to occur over an extended period. Further, such robots are not compatible with standard milking clusters with the milking cups being incorporated within the robot arm. Others, such as the De Laval VMS range pick up and attach each cup independently, with each cup being on a separate hose, rather than a cluster. Thus they cannot economically be retrofitted to conventional milking parlours.

WO00/72664 discloses a milking robot having milking cups integrated into the robot arm. This milking robot requires one arm per milking bale.

EP689761 discloses a milking parlour in which one robot services the bales of a rotary platform but provides no details as to the construction of the robotic arm.

U.S. Pat. No. 4,508,058 discloses one robotic arm servicing a rotary platform but provides no disclosure as to how the cups are located by the milking arm.

It is an object of the present invention to provide a milking cluster positioning device which goes some way to overcoming the abovementioned disadvantages or which at least provides the public or industry with a useful choice.

It would be desirable to provide a robotic arm and method of milking that allowed a robotic arm to attach the cups of a standard milking cluster for a number of bales of a standard parlour or to at least provide the public with a useful choice.

Statements of Invention

According to one exemplary embodiment there is provided a robotic milking system comprising:
 a milking cluster having a plurality of cups connected to a bowl;
 a retractor to withdraw the cluster so that the cups hang down below the bowl;
 a robotic arm that is not permanently attached to the milking cluster arranged to acquire and hold the plurality of cups of the cluster as they hang below the bowl and actuators for moving the arm to facilitate the attachment of the cups to an animal; and
 one or more guide arms positionable with respect to the robotic arm in a first configuration to define a radially tapering opening between the robotic arm and the guide arm to assist in locating cups within the tapering opening and positionable with respect to the robotic arm in a second configuration in which the cups are brought into closer proximity to the robotic arm for capture.

There is further provided a milking cluster guide, comprising:
 a support assembly configured to rest on a surface and provide a support platform onto which items can be mounted;
 a positioning assembly mounted on the support assembly and configured to move on the support assembly both radially and tangentially; and
 a pair of arms mounted on the positioning assembly, the arms generally horizontally aligned and having at least an open position where the arms are positioned to taper radially.

There is further provided a robotic milking arm comprising:
 a robotic arm arranged to acquire and hold a plurality of cups of a milking cluster having actuators for moving the arm to facilitate the attachment of the cups to an animal; and
 one or more guide arm positionable with respect to the robotic arm in a first configuration to define a radially tapering opening between the robotic arm and the guide arm to assist in locating cups within the tapering opening and positionable with respect to the robotic arm in a second configuration in which the cups are brought into closer proximity to the robotic arm for capture.

There is also provided a method of positioning a milking cluster guide comprising the steps of:
 positioning a plurality of grippers configured to grasp around the body of a teat cup through the centre of a cluster of teat cups hanging below an associated bowl;
 moving a pair of arms inwards so that the arms are positioned around the outside of the cluster; and
 moving the arms towards the centre of the cluster to push the teat cups into a position for engagement with the grippers.

Preferred embodiments are set out in the claims and are incorporated in the description by reference.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

FIGS. 4a to 4e show a system and method for locating the cups of a standard milking cluster;

FIGS. 5a to 5h show a system and method for holding cups;

FIGS. 6a to 6k show a system and method for attaching cups to the teats of an animal;

FIGS. 7a and 7b show the operation of the valve formed by a bowl inlet and a feed line;

FIG. 8 shows a guide for positioning the cups of a milking cluster;

FIG. 9 shows cups positioned in the guide shown in FIG. 8;

FIG. 10 shows an alternative guide design;

FIG. 16 shows a typical milking parlour bale partition, with additional features for milking cluster location;

FIGS. 18a to 18c show a standard milking cup and a method for restricting vacuum flow within the cup;

FIG. 28 shows a perspective view of the robotic milking arm shown in FIG. 25 when the cups have been acquired by grippers and the guide arms are retracted.

DETAILED DESCRIPTION OF EMBODIMENTS OF THE INVENTION

The invention will be described with reference to a milking parlour using a rotary platform. However, it is to be appreciated that the robotic milking system of the invention may be applied to any desired milking configuration.

Figure 1:
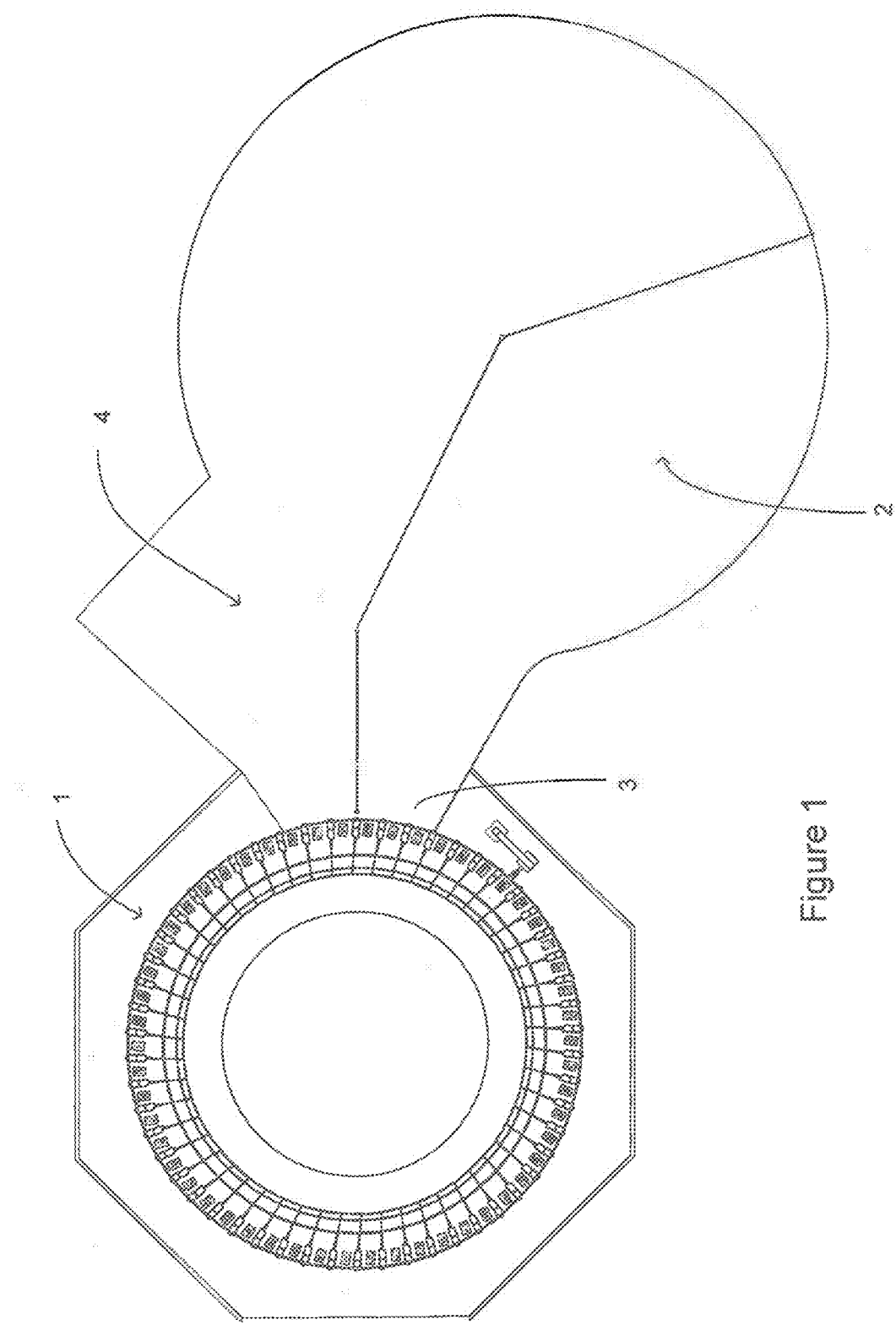
FIG. 1 shows a plan view of a milking parlour having a rotating platform.

Referring to FIG. 1 a milking parlour having a rotary platform 1 is shown. Animals enter into an entry area 2 and advance to a loading area 3. Once the rotary platform 1 has performed a revolution the cows exit via exit area 4.

Figure 2:
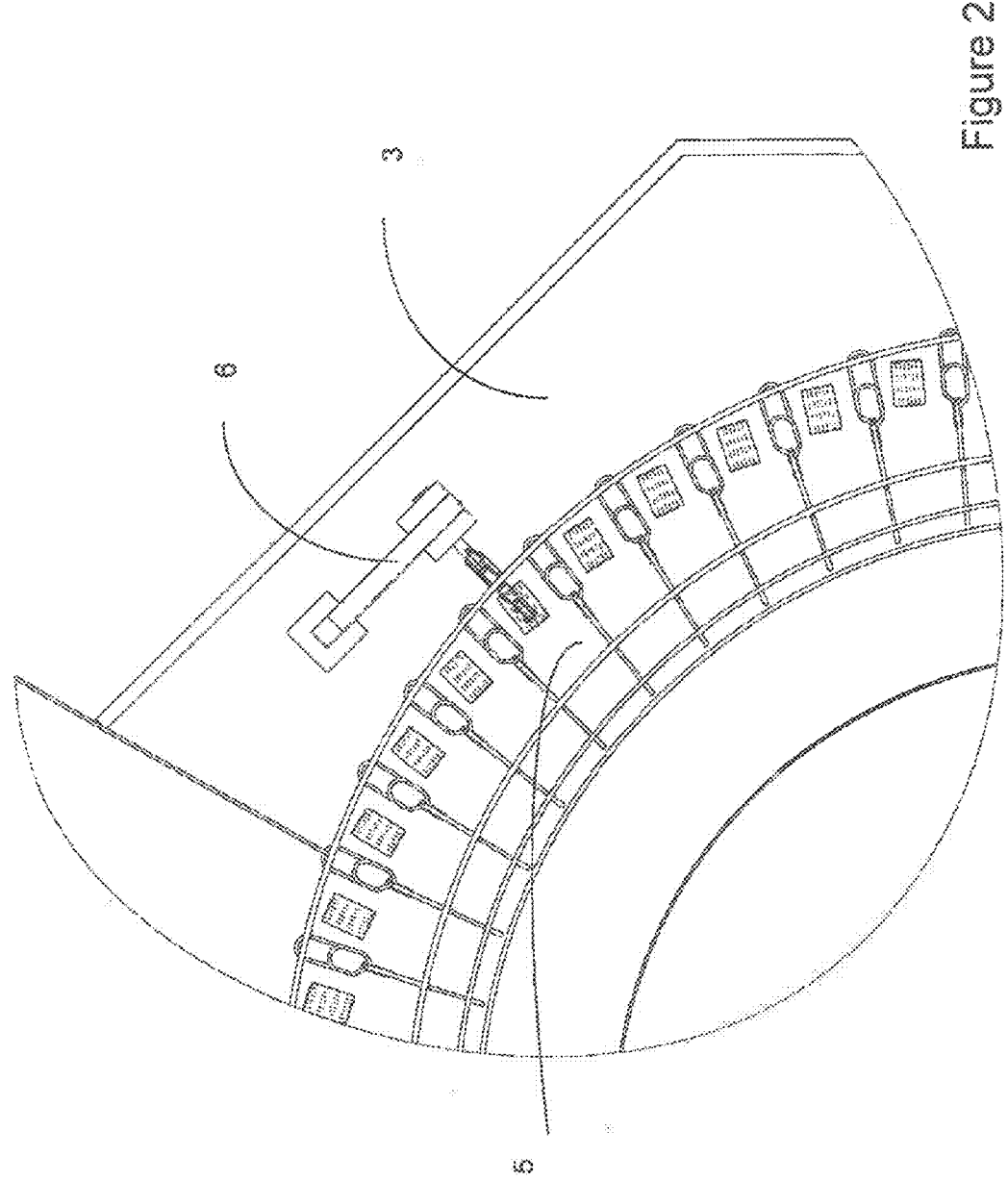
FIG. 2 shows an enlarged view of the cup loading area to the rotating platform shown in FIG. 1.
Figure 3:
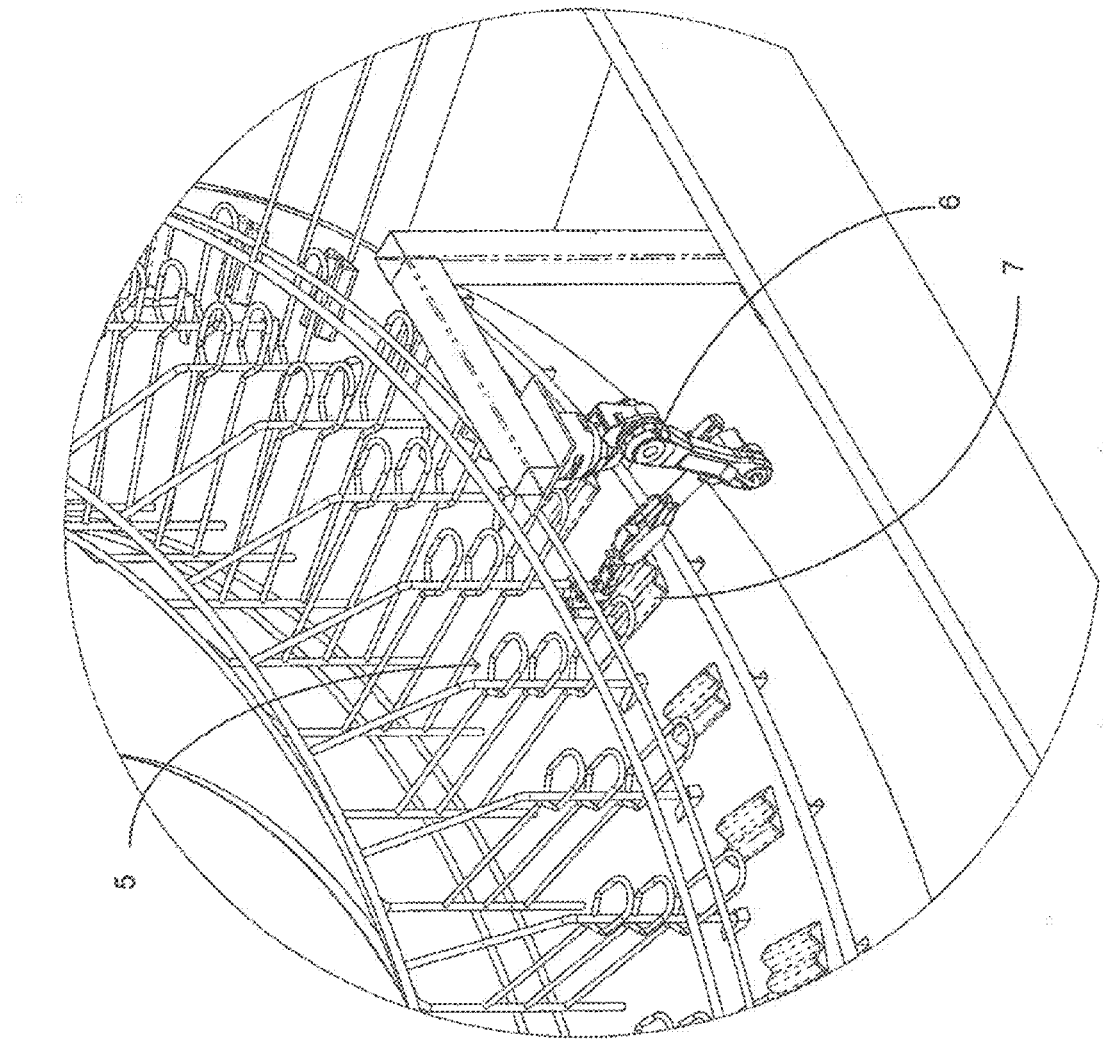
FIG. 3 shows a perspective view of a robotic arm operating in the entry area shown in FIG. 2.

As shown in FIGS. 2 and 3, from loading area 3 the cows advance into individual bales 5 of rotary platform 1. Robotic arm 6 locates the cups for each milking cluster in each bale and attaches the cups to the teats of an animal as it passes the robotic arm 6. Spreaders 7 keep the animals rear legs spread apart to facilitate operation of the robotic arm through the animal's rear legs.

Each bale has a milking cluster associated with it which supplies milk to a central milk collection system. As shown in FIG. 4a a flexible line 8 of a cup remover is connected to each cluster 9 and after the vacuum to each cluster is removed line 8 retracts cluster 9 to an anchor point 10 on the side of the bale.

FIGS. 4b to 4e show the steps involved in the location of milking cups. Milking cups 11, 12, 13 and 14 are initially hanging from anchor point 10 as shown in FIG. 4c with guides 15 and 16 located on either side and plate 21 located below the cups. Guide 15 has narrowing slots 17 and 18 leading to confined regions 17a and 18a. It will be appreciated that a range of guide slot geometries may be employed. Guide 16 likewise has narrowing slots 19 and 20 leading to confined regions 19a and 20a. To locate the cups guides 15 and 16 are moved towards one another so that cups 11, 12, 13 and 14 are guided by narrowing slots 17, 19, 18 and 20 into confined regions 17a, 19a, 18a and 20a as shown in FIG. 4d. Once guides 15 and 16 have been moved together plate 21 is raised to the position shown in FIG. 4e so that the cups are all maintained at a constant height.

Referring now to FIGS. 5a to 5h a method for holding located cups using a robotic arm will be described. As shown in FIGS. 5a and 5b a robotic arm 22 having grippers 23, 24, 25 and 26 is advanced between the milking cups 11, 12, 13 and 14 to the position shown in FIGS. 5c and 5d. Grippers 23, 24, 25 and 26 then grip cups 11, 12, 13 and 14 as shown in FIGS. 5e and 5f. Each gripper 23, 24, 25 and 26 can be moved towards or away from robotic arm 22 via shafts connected to actuators in robotic arm 22 (for example shaft 27 connected to gripper 25 or shaft 28 connected to gripper 26).

Once the cups have been gripped guides 15 and 16 and plate 21 are moved away. Grippers 23, 24, 25 and 26 may be moved towards robotic arm 22 so that the feed lines are curved so that a wall of each feed line is forced against inlets of the milking bowl to prevent the application of vacuum to the cups. FIGS. 7a and 7b show the operation of the valve formed by the bowl inlet and feed line in detail. In the open position feed line 29 connects to inlet 33 in a straight through fashion. As shown in FIG. 7b when feed line 29 is curved beyond a certain extent one wall of feed line 29 closes the opening of inlet 33 and prevents the application of a vacuum to feed line 29. For example, cup 13 may be moved upwardly so that a wall of feed line 29 is forced against inlet 33 of bowl 31 to act as a valve closing feed line 29. Likewise for feed line 30 and inlet 32. FIGS. 6a and 6b show the cups moved towards robotic arm 22 so as to close feed lines 29 and 30 by forcing a wall of the feed line against the respective inlet 32 and 33.

As shown in FIGS. 6c and 6d and 6e the head of the robotic arm then rotates through 180° to invert the cups so that they may be attached to teats 34 and 35 of an animal. One cup is elevated at a time above the other cups for attachment to the teats of an animal. As shown in FIG. 6g an actuator elevates gripper 26 which raises cup 14 above the other cups. Raising cup 14 also straightens feed line 30 so that a vacuum is applied to cup 14 facilitating its attachment to teat 35 of an animal. Cup 14 may be positioned onto teat 35 via manipulation of robotic arm 22 utilising a conventional vision system to guide the robotic arm. By applying vacuum to one cup at a time a full vacuum may be employed to attach each cup to a teat.

Referring now to FIGS. 6h and 6i, once a cup is attached its gripper 26 is released and the next cup 13 is elevated and attached in a similar manner. Once all cups are attached (FIGS. 6j and 6k) robotic arm 22 is retracted and moved to the next bale to attach the milking cups to the next animal.

When the rotary platform rotates almost through a full revolution and is adjacent the exit area 4 shown in FIG. 1 the vacuum to the milking cluster is disengaged and the cups drop off the teats of the animal. The milking cluster is then retracted via line 8 to be held adjacent anchor point 10 ready for attachment to the next animal. The animal then exits from the rotary platform into the exit area 4.

Referring now to FIGS. 8 to 15 alternative guides for guiding the cups of a milking cluster to desired locations are shown. It will be appreciated that when in their desired locations the cups may be gripped with the robotic milking arm previously described and so gripping the cups with a robotic arm and applying the cups to the teats of animals will not be described in relation to these embodiments—although it will be appreciated that the same method and robotic arm may be used.

Referring to FIG. 8 a milking cluster guide 34 is shown having a central aperture 35 with slots 36 radiating outwardly. A main supply line 37 connected to milking cluster 38 passes through central aperture 35. When the vacuum is shut off from cluster 38 and the cluster drops from the teats of an animal then the cluster may be retracted by line 37. The guide is configured and arranged to allow bowl 39 of milking cluster 38 to pass therethrough (due to material flexibility and/or dimensions) and to position cups 40 to 43 of the milking cluster at the distal regions of slots 36 when the milking cluster is drawn through the guide 34. In this way the cups may be presented oriented upwardly as shown in FIG. 9 ready for collection by a robotic arm (as described previously). The guide may be positioned in a milking bale below the location of the teats of an animal to be milked to facilitate rapid collection and attachment. In this case a removable cover may be provided to cover the cups during animal movement and uncover the cups before attachment of the cups.

Referring now to FIG. 10 an alternative embodiment is shown. In this embodiment bowl 44 remains hanging down and extra long feed lines 45 to 48 are employed. In this case each feed line 45 to 48 passes through a respective aperture 54 to 57 in guide 53. When cups 49 to 52 drop off the teats of an animal when the vacuum is shut off then bowl 44 is raised and cups 49 to 52 are positioned adjacent apertures 54 to 57. The cups 49 to 52 may then be collected by a robotic arm and attached as previously described.

Figure 12:
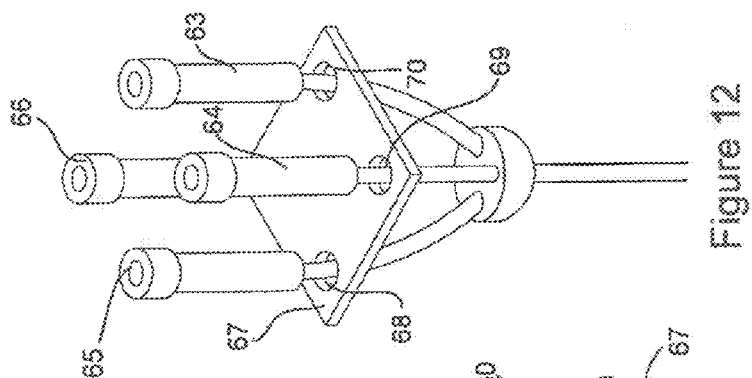
FIG. 12 shows the arrangement of FIG. 11 when inverted.
Figure 11:
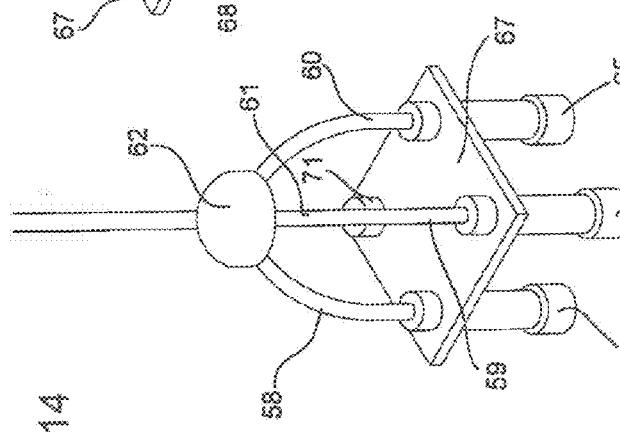
FIG. 11 shows the guide of FIG. 10 employed with a standard milking cluster.

FIGS. 11 and 12 show a variant to the design shown in FIGS. 9 and 10 in which a standard milking cluster is employed having standard lengths for feed lines 58 to 61. In this embodiment an actuator (not shown) may be employed to move guide 67 towards or away from bowl 62. When guide 67 is moved away from bowl 62 cups 63 to 66 are located adjacent apertures 68 to 71 in guide 67 ready for collection by a robotic arm. Once collected by a robotic arm guide 67 is moved towards bowl 62 to allow freedom of movement of cups 63 to 66 for attachment. FIG. 12 shows an inverted arrangement. The arrangement of FIG. 11 could be inverted to the position shown in FIG. 12 prior to attachment or guide 67 could be maintained in the orientation shown in FIG. 12 throughout milking operations.

Figure 14:
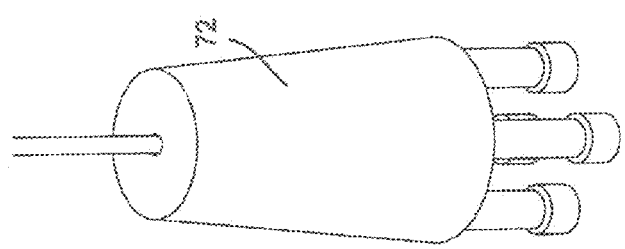
FIG. 14 shows a milking cluster drawn into the sheath type guide shown in FIG. 13.
Figure 15:
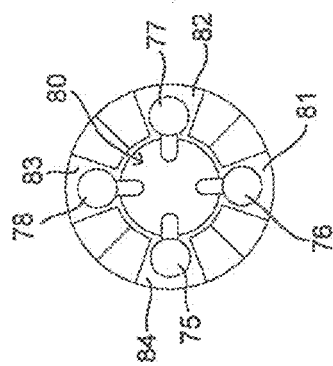
FIG. 15 shows a bottom view of the arrangement shown in FIG. 14.
Figure 13:
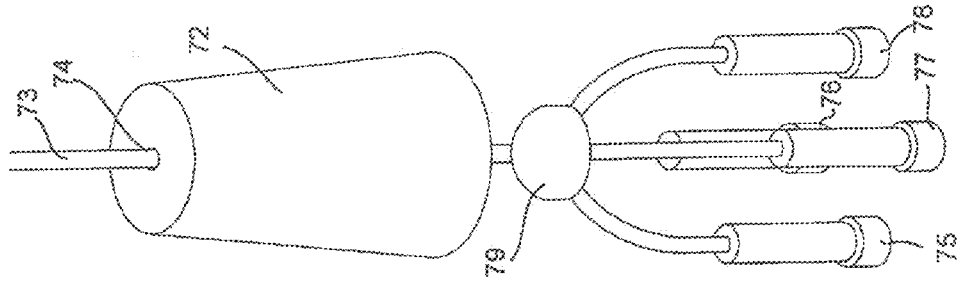
FIG. 13 shows a method of positioning cups using a sheath type guide.

FIGS. 13 to 15 show another embodiment in which a sheath is used to position the cups of a milking cluster. A main supply line 73 passes through an aperture 74 in sheath 72. When the cups 75 to 78 are released from the teats of an animal main supply line 73 may be raised to draw the bowl 79 and cups 75 to 78 into a cavity 80 within sheath 72. The cavity includes longitudinal grooves 81 to 84 configured to receive cups 75 to 78 and position them in known positions for collection by a robotic arm as shown in FIGS. 14 and 15. Collection and attachment by the robotic arm is thereafter as described above.

FIG. 16 shows an alternative embodiment incorporating a typical milking parlour bale partition 85. To this partition has been added a frame structure 86 incorporating a sheath 87 to locate the milking cluster bowl, and four scalloped recesses 88 to loosely locate the four cups. As the milking cluster is withdrawn following milking, the retractable line is pulled through a guide in the sheath 87 causing the bowl to locate there at the end of the retraction. Guide means within the sheath 87 cause the bowl to be oriented in a repeatable manner. The recesses 88 are positioned to thus line up with the approximate hanging locations of the cups, and act as a guide for the robotic gripper (not shown) during cup pick-up.

Figures 17A, 17B, 17C, 17D:
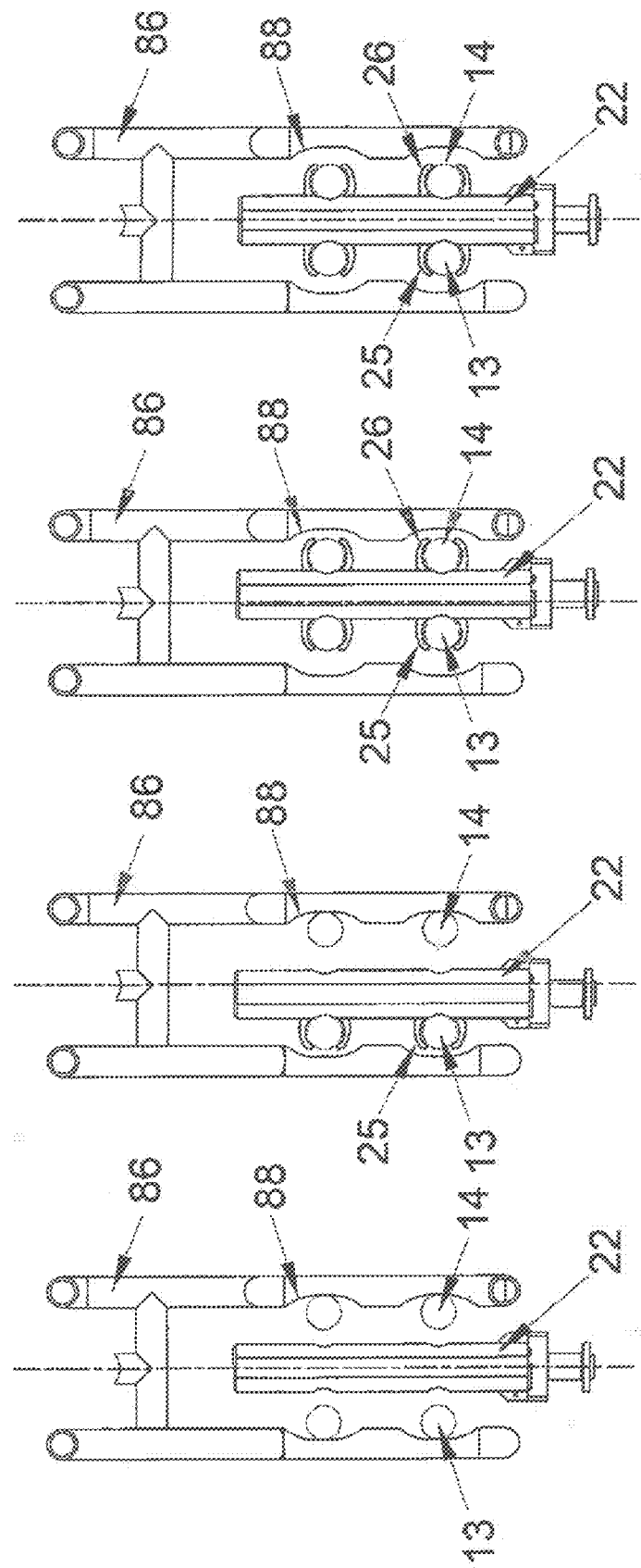
FIGS. 17a to 17d show a system and method for holding cups using the feature of FIG. 16.

FIGS. 17a to 17d show how the robotic gripper 22 picks up and holds the cups 13 and 14 in the guide means shown in FIG. 16. In FIG. 17a, the gripper 22 has been inserted between the left-hand pair of cups 13 and the right-hand pair of cups 14. It is then moved towards the left-hand cups 13 as shown in FIG. 17b, and the left-hand gripper jaws 25 are closed about the pair of cups 13. Moderate cup misalignment is accommodated by the motion of the gripper jaws 25 crowding the cups 13 into the recesses 88. FIG. 17c shows the gripper 22 moved to the right, from where the right-hand jaws 26 have closed about the right-hand pair of cups 14. In FIG. 17d the gripper 22 has moved back to the central position from where it can be withdrawn to attach the cups to the cow.

FIGS. 18a to 18c show a typical milking cup 13. FIG. 18a is an external view of the cup. FIG. 18b shows a cross-section through the cup 13. Inside the external shell of the cup 13 is a cup liner 89 which incorporates the cup opening and the vacuum hose 91 to the claw of the bowl (not shown). Between the opening and the hose 91 the liner 89 seals on the cup shell. During milking air is pulsed through the pulsation line fitting 90 to cause the liner 89 to pulse about the cow's teat and thus stimulate it. FIG. 18c shows an embodiment where the pulsation is paused, and sufficient constant air pressure is applied through the pulsation line fitting 90 to cause the liner 89 to temporarily collapse thus restricting the vacuum flow through the cup. This embodiment can be used to close off the vacuum to cups not attached to the cow's teats in order to ensure that cups that are attached to the teats have sufficient vacuum to hold them on.

Whilst the invention has been described with reference to grippers holding the milking cups it is to be appreciated that the cups may be held using a variety of holding means including suction cups or any other device suitable for holding a milking cup.

A further embodiment will now be described with reference to FIGS. 1 to 3 and 19 to 24. The guide disclosed below describes a system employing two arms but it will be appreciated that in a minimal configuration only one arm is required.

A milking cluster guide 100 is generally comprised of five main sub-parts: a stand 102, a trolley frame 103, a guide track 104, a guide carriage 105 and a pair of guide arms 106. These sub-parts and their relationship are described in detail below.

Stand

The stand 102 is comprised of frame members that form a base 107 and a framework 108. The base 107 is configured so that in use it will rest on a surface and form a stable base for the guide 100, on a surface such as the floor of a milking shed or similar. The base 107 and framework 108 are mutually connected and arranged so that the framework 108 extends upwards from the base 107 to form a generally horizontal top mounting portion above the base 107. The overall height of the base 107 and framework 108 (and the height of the top mounting portion above the base) can be varied, depending on the relative differences in height between the milking stalls and the surface or floor on which the guide 100 is located, but for most variants will generally be between 75 cm and one metre. The base 107 is generally formed as a hollow rectangle from galvanised steel tubing or similar. Feet 109 are connected to the underside of the base 107 towards each corner on the shorter sides by a threaded connection or similar so that the vertical position of each foot 109 relative to the base 107 can be adjusted over short distances. In this way, the guide 100 can be kept level even if used on uneven or non-horizontal surfaces, by adjusting the position of the feet 109 individually as necessary.

The framework 108 generally comprises two legs 110 that are connected at or towards the midpoint of each of the shorter sides of the base 107 and which extend vertically upwards. A crosspiece 111 is connected to the top of each leg, the crosspieces extending horizontally in parallel with and directly above the shorter sides of the base 107. The crosspieces 111 are connected to the legs 110 at generally their midpoint so that the leg 10 bisects the crosspiece 111. The upper surfaces of each of the crosspieces 111 provides the top mounting portion. Upwardly extending flange plates 113 are connected to the ends of each of the crosspieces 111 to prevent items resting on the crosspieces 111 from slipping off sideways. Ideally, these are also formed from galvanised steel tubing or similar, as the base 107 and framework 108 are required to resist the harsh wet environment of a milking shed.

The hollow rectangle formed by the members of the base 107 can be used to provide a storage platform, or a platform for the connection of auxiliary items. This can be achieved by adding additional cross-members to form the platform, or connecting items directly to the base 107 or legs 110. For example, a junction box 112 can be connected to one of the legs 110 to provide a connection and junction for a power source.

Trolley Frame

The trolley frame 103 comprises two rails 103a, 103b connected at their ends by braces 114 so that the rails 103a, 103b are aligned parallel to one another. The braces 114 are substantially the same length as the crosspieces 111. The rails 103a, 103b are substantially the same length as the long sides of the base 107. The braces 114 rest on top of the crosspieces 111 so that the rails 103a, 103b extend from one crosspiece at one end to the crosspiece at the other end. The braces 114 are prevented from slipping sideways by the flange plates 113. The outer rail 103a is a 'C'-section rail, the inner rail 103b is an 'L' section. The uprights of the rails are aligned towards the outer sides of the guide 100. The rails 103a, 103b are formed from anodised aluminium or similar. The trolley frame 103 is mounted on the stand 102 so that the guide track 104 can run from one end of the rails 103a, 103b to the other (that is, from one end of the guide 100 to the other lengthways).

Guide Track

The guide track 104 generally comprises an elongate guide rail assembly 115 and wheel mounting assemblies 116a, 116b. The guide carriage 105 is mounted on the guide rail assembly 115 in a manner described in detail below. The wheel mounting assemblies 116a, 116b are connected to the underside of the guide rail assembly 115. The inner wheel mount 116b is connected at or towards the inner end of the guide rail assembly 115, with the outer wheel mount 116a connected outwards of this ('inwards' and 'outwards' as used in this specification refer to in-use positioning relative to a rotating platform—radially inwards towards or closest to the rotating platform, or radially outwards away or furthest from the rotating platform, unless the context clearly indicates otherwise). The outer and inner wheel mounts 116a, 116b are configured so that the inner end of the guide rail assembly 115 is angled upwards, or above, the outer end. Each of the wheel mounts 116a, 116b further comprises a wheel 117, the wheel mounts 16a, 16b configured and connected to the guide rail assembly 115 so that the wheels 117 locate into/onto the inner and outer rails 103b, 103a so that the guide track 104 can travel from one end of the rails 103a, 103b to the other. That is, from one end of the guide 100 to the other. The wheel mounting assembly and guide rail assembly 115 are connected so that when the wheels 117 are located in/on the rails 103a, 103b, the guide rail assembly 115 is aligned perpendicular to the rails 103a, 103b—that is, so that the mounted guide carriage 105 will travel along the length of the guide rail assembly 115 from one end to the other perpendicular to the rails 103a, 103b. The wheels are formed from a metal such as galvanised steel or anodised aluminum.

A pneumatic cylinder 118 is mounted to the inner wheel mount 116b to provide motive power to move the guide track 104 along the rails 103a, 103b.

The guide rail assembly 115 comprises an elongate body 115a, formed from galvanised steel 'C'-section or similar with the open face aligned downwards. A pair of rods 115b are mounted on top of this, running from end-to-end of the body 115a. The guide carriage 105 is mounted to and travels along the length of the rods 115b. A pneumatic cylinder 119 is mounted at the inner end of the body 115a and is used for moving the guide carriage 105 along the rods 115b.

Guide Carriage

The guide carriage 105 has a main body 105a which is 'U'-shaped. The underside of the main body 105a is configured to be slidably mounted to the rods 115b, the pneumatic cylinder 119 providing motive power for the guide carriage 105 on the rods 115b.

A pair of guide arms 106a, 106b are mounted on the guide carriage 105 as outlined below.

Guide Arms

A pair of guide connectors 120 are mounted at the outer end of each of the upright sides or legs of the 'U'-shaped main body 105a. The guide connectors 120 are mounted so that they can rotate around a generally vertically aligned axis. A pair of guide arms 106 are mounted to the guide connectors 120 at or close to their inner ends, so that the guide arms 106 extend horizontally outwards from the guide connectors 120. The guide arms 106 have the general overall form of straight rods, with an upwards kink or bend formed in each of the arms just inward of their connection to the guide connectors 120. The body 105a and guide connectors 120 are configured so that the guide connectors 120 rotate about a generally vertical axis, with the guide arms 106 extending and rotating in a generally horizontal plane. The guide connectors 120 are configured so that the guide arms 106 can rotate between an open and a closed position. In the closed position the guide arms 106 extend outwards, parallel to each other and the guide rail assembly 115, above and slightly to each side of the guide rail assembly 115. The guide connectors 120 rotate from the closed to the open position so that in the open position, in plan view the arms 106 form a 'V' shape, each guide connector 120 rotating the same amount so that the 'V' has an axis of symmetry in plan view, the axis of symmetry aligned with the axis of the guide rail assembly 115. The wider or open end of the 'V' faces inwards so that the 'V' shape tapers or narrows with increasing radius. That is, tapers radially. The arms are formed from a metal or plastic, and are at least partly covered on their inwards-facing portions with a resilient spongy material. This material allows for slight misalignment in the relative positions of the cups 124, the arms 106 and the gripper portion 123, acting as a damper for the dangling milking cups before they are crowded and gripped.

The connectors 120 are moved and operated by a pair of pneumatic cylinders 121 that are mounted on each side of the guide carriage 105. The guide arms 106 can operate together, moving at the same or different speeds, or independently, one moving while the other remains stationary.

Operation

In use, the guide 100 is mounted or positioned on the floor of a milking parlour or shed such as the parlour shown in FIG. 1. Referring to FIG. 1 a milking parlour having a rotary platform 1 is shown. Animals enter into an entry area 2 and advance to a loading area 3. Once the rotary platform 1 has performed a revolution the cows exit via exit area 4.

As shown in FIGS. 2 and 3, from loading area 3 the cows advance into individual bales 5 of rotary platform 1. Robotic arm 6 locates the cups for each milking cluster in each bale and attaches the cups to the teats of an animal as it passes the robotic arm 6. The guide 100 assists with this process as described below. Spreaders 7 keep the animals rear legs spread apart to facilitate operation of the robotic arm through the animal's rear legs.

Each bale has a milking cluster associated with it which supplies milk to a central milk collection system. In this embodiment, the milking clusters comprise four teat cups 124 connected to a central collecting bowl or claw via short lengths of tube. The collecting bowl is connected to a longer milk tube for collecting and transporting the milk from the teat cups 124, and a longer pulse tube that connects via the bowl to the shorter pulse tubes and the teat to provide a pulsing or milking action. The milking cluster is stored with the bowl upwards and the teat cups 124 hanging or dangling below the bowl.

Figure 19:
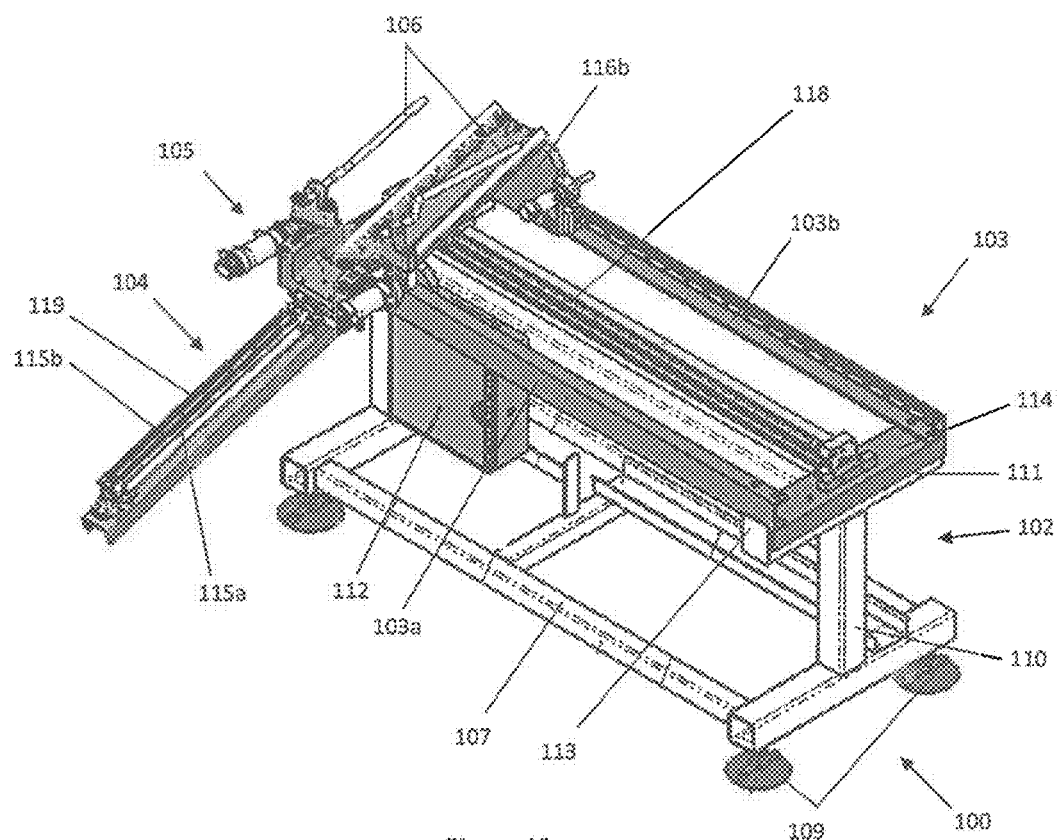
FIG. 19 shows a perspective view to one side, and from the outside looking inwards towards the rotating platform, of a milking cluster positioning device that in use is positioned between the robot arm and the periphery of the rotating platform, the positioning device supporting a pair of guide arms that act with the robot arm to assist with positioning a milking cluster.

The guide 100 is co-located with the robot arm 6, mounted on the floor of the parlour close to the periphery of the rotating platform 2, in an area separated by partitions from the loading and entry area 3 and exit area 4. The guide 100 is aligned across the periphery of the rotating platform—that is, generally in parallel to a tangent to the rotating platform. The robot arm 6 is mounted circumferentially further outwards or behind the guide 100. In the starting position, the guide carriage 105 is positioned at one end of the positioning device—the left of the positioning device as shown in FIG. 19. This is towards the direction from which the platform is rotating. The guide carriage 105 starts rearward or outward on the rods 115b. The guide arms 106 start in the open position (see FIG. 20).

As the platform rotates, a stall partition and associated milking cluster rotate in front of the guide 100 and robot arm 6. The robot arm 6 engages to move forward or inwards towards the rotating platform 1. The inwards end or part of the robot arm 6 forms a gripper portion 123. The gripper portion 123 is similar to that described above with reference to FIGS. 17a to 17d, and comprises a generally cuboid main body, with four pairs of grippers or pincers 125 that extend and retract from two opposed sides of the gripper portion, two pairs on each side arranged along the length at generally the same height on each of the opposed sides, each side mirroring the other. The grippers 125 open to fully retract within the body of gripper portion 123 through slots in the side, and pass outwards through the slots, rotating around a central vertically aligned pivot point just behind or inwards of the side wall to close. Although the robot arm 122 has a number of axes around which the members can rotate and move, the sides of the gripper portion 123 are aligned generally vertically when in use. The gripper portion 123 passes between the dangling teat cups 124 with the grippers 125 open and retracted into the gripper portion 123, and under the bowl so that two of the teat cups 124 are on each side of the gripper portion 123.

Figure 20:
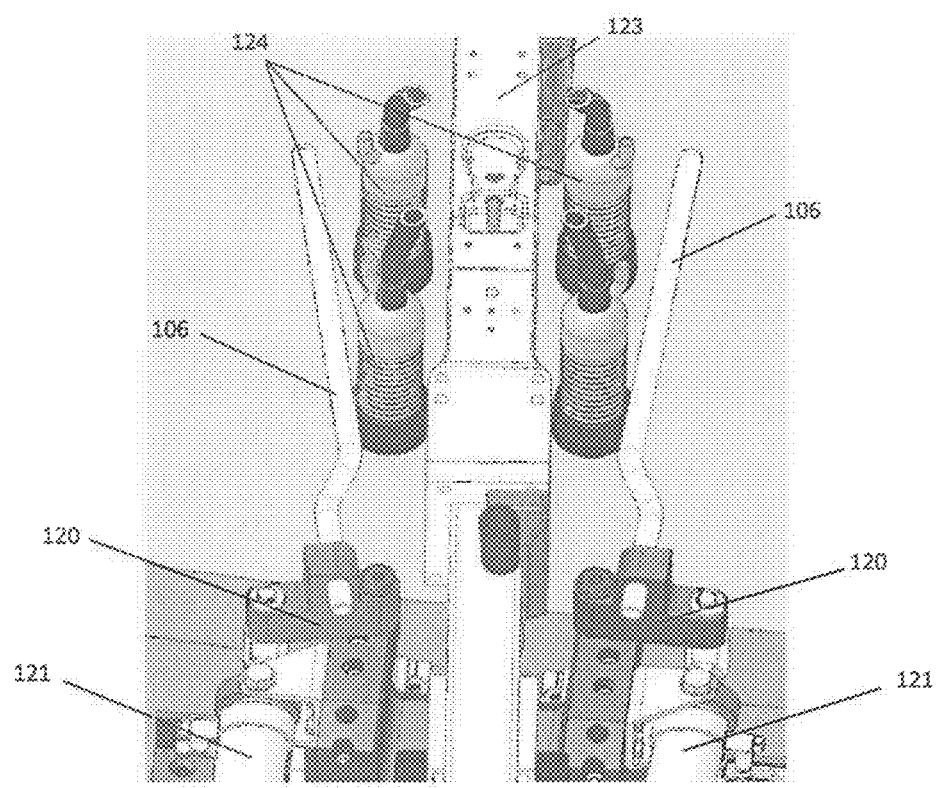
FIG. 20 shows a detail view from above and looking radially inwards of a portion of the milking cluster positioning device, with a robot arm and a milking cluster also shown, the guide arms of the milking device aligned in a 'V'-shape with the open end inwards and extending each side of the four hanging teat cups of the milking cluster, roughly halfway along the length of the hanging teat cups so that the cups are located between the vertical pincer sides of the gripper portion of the robot arm and the guide arms.

Pneumatic cylinder 119 activates to move the guide carriage 105 inwards towards the milking cluster. When the guide carriage is at the end of the rods 115b, or fully forwards and upwards, it is under the gripper portion 123 of the robot arm, with the arms of the 'V' formed by the guide arms 106 extending each side of the four hanging teat cups, roughly halfway along the length of the hanging teat cups. The cups 124 are now located between the vertical pincer sides of the gripper portion 123 and the arms 106, as shown in FIG. 20.

Figure 21:
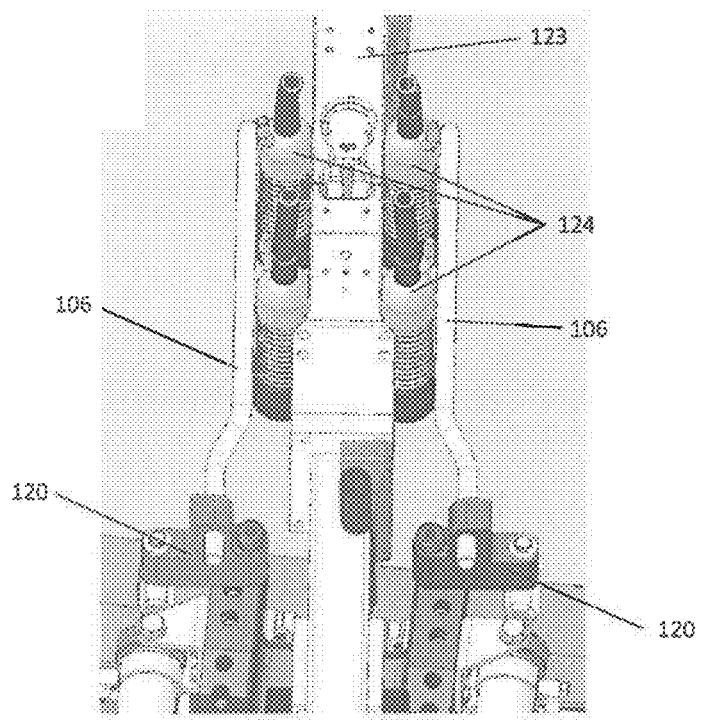
FIG. 21 shows a similar view to that of FIG. 20, with the guide arms rotated inwards around pivot points at the base of the 'V', so that they are generally parallel with each other and the gripper portion, the cups pressed inwards against the vertical pincer sides of the gripper portion.

The pneumatic cylinders 121 then activate to move the arms 106 to the closed position. As the arms 106 move to the closed position, they move the teat cups 124 inwards and press these against the sides of the gripper portion 123 as shown in FIGS. 21 and 22.

Figure 22:
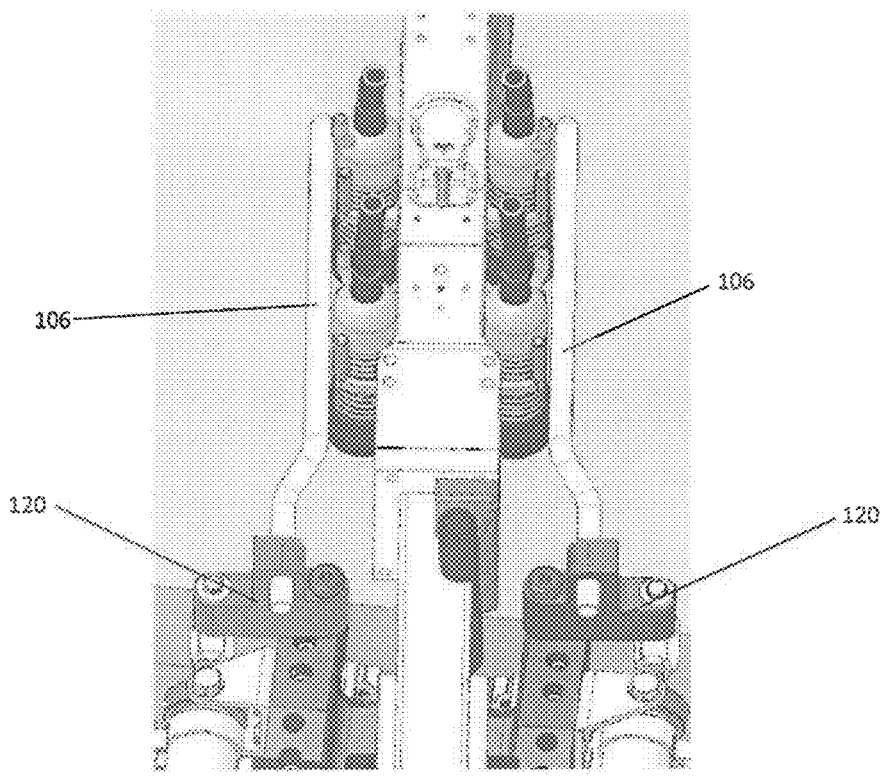
FIG. 22 shows the same view as FIG. 21, with pincers activated to extend from the sides of the gripper portion to grip the cups.
Figure 23:
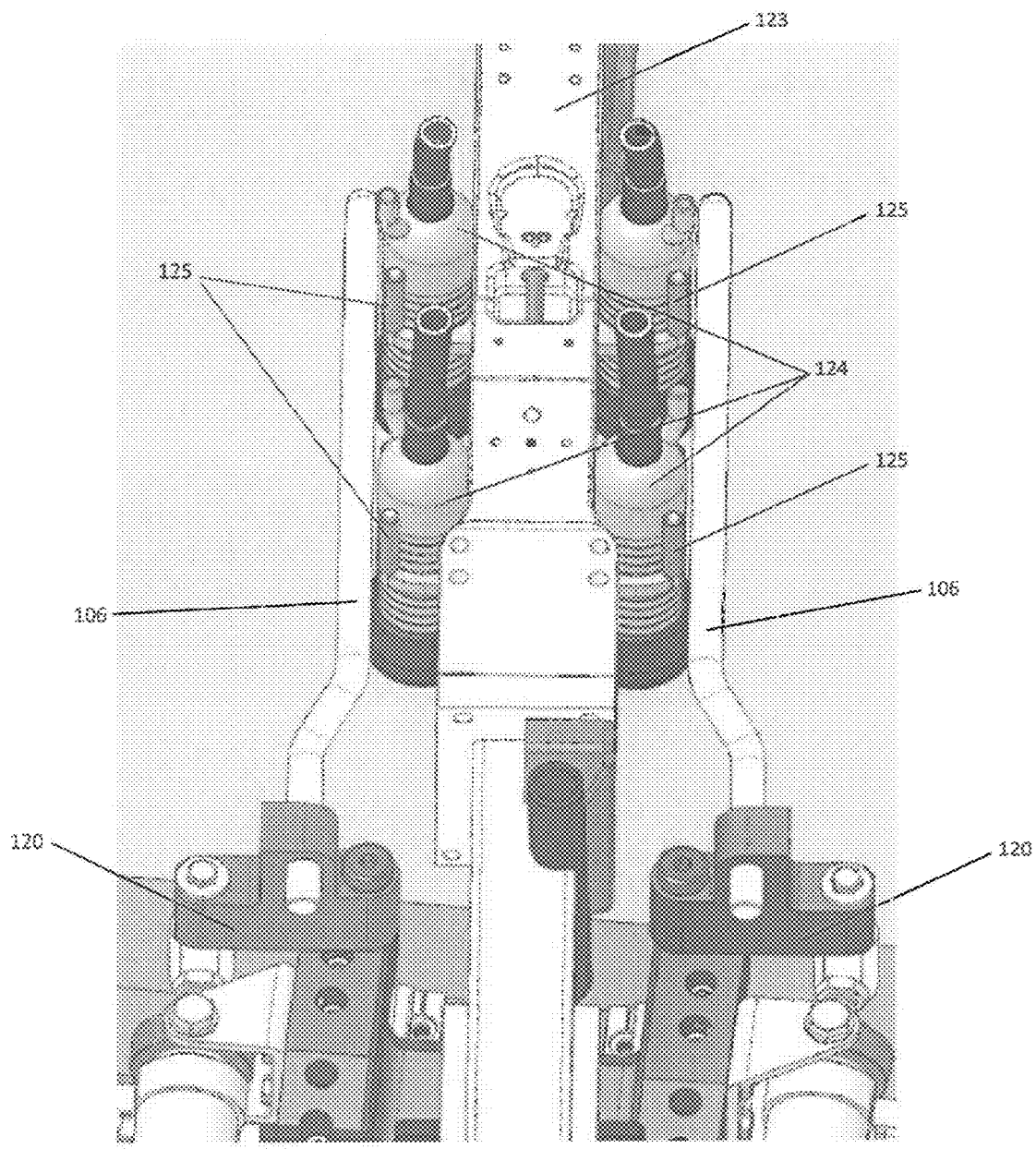
FIG. 23 shows a close-up view of the guide arms, gripper portion, pincers and cups of FIG. 22.
Figure 24:
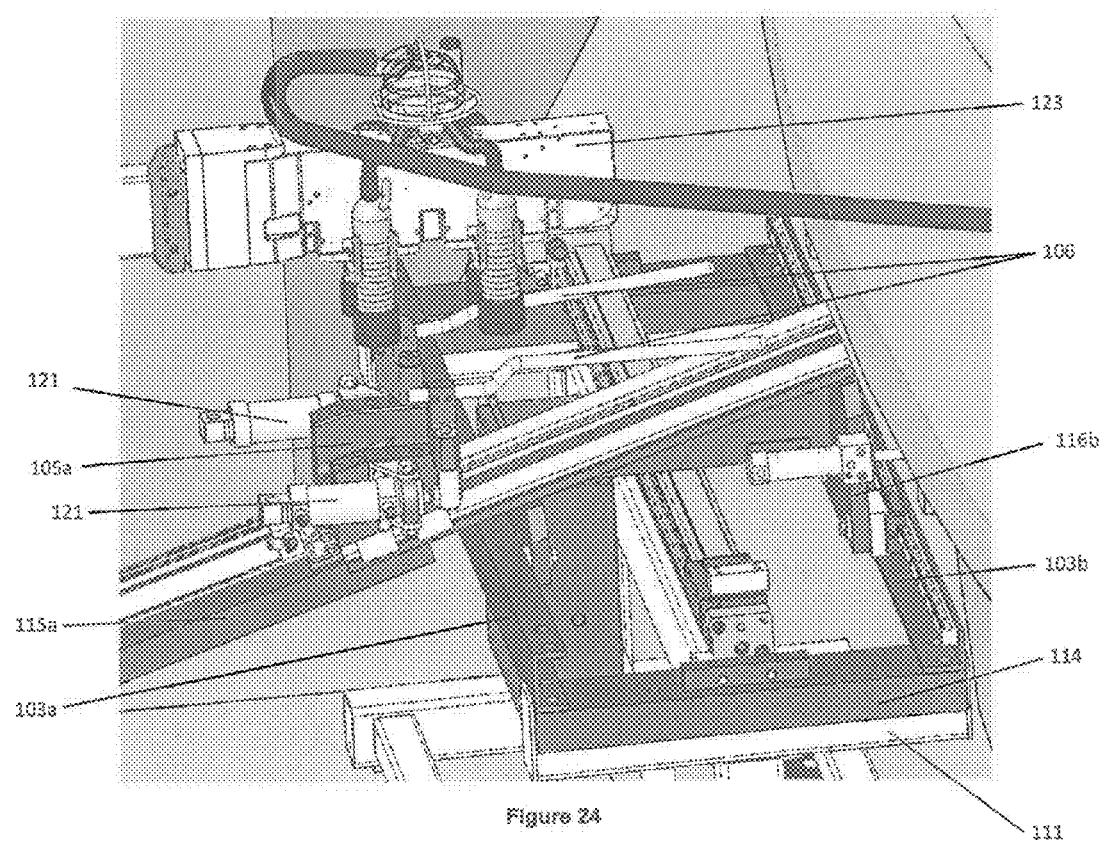
FIG. 24 shows a perspective view from the side and above of the milking cluster positioning device, robot arm and milking cluster of the preceding figures, the milking cluster engaged with the robot arm, the guide arms open and disengaged below the robot arm and cluster.

The grippers 125 then close, extending/rotating outwards from the sides of the gripper portion 123, rotating closed around each of the teat cups 124 to securely grasp the teat cups 124 against the sides of the gripper portion 123, as shown in FIG. 22.

Pneumatic cylinder 118 now activates to move the guide track 104 along the rails 103a, 103b from left to right (looking inwards towards the centre of the rotating platform 101), following the rotational direction of the platform. The robot arm rotates to cause the gripper portion 123 to move with the guide track.

The pneumatic cylinders 121 now act to disengage the arms 106 and move them from the closed position to the open position. The robot arm 6 lifts vertically upwards after the arms 106 are disengaged and lifts the milking cluster upwards, removing this from the partition and rotating it to face upwards so that it can be positioned under an animal to start the milking cycle.

The guide 100 then resets to the initial position.

The arrangement described above has several advantages: the combination of the guide track and the guide carriage allow movement of the guide arms both radially and tangentially; the milking clusters used are the same as for existing systems such as manual systems and do not have to be custom-made or tailored to suit a particular shed or environment. The arrangement lends itself to a multi-teat system such as the four teat system in general use for cows and existing dairy milking parlours. The arrangement described can be used in both rotary platform and herringbone sheds, and there is no minimum or maximum number of stalls or bales. This allows the system to be retrofitted to existing sheds with minimal interference and changes necessary. The system described uses a minimal number of movements and operations to collect and move the cups, cutting down on cycle time and increasing the efficiency. Furthermore, the teats are collected in a single action and larger differences or discrepancies in position can be compensated for (i.e. the radially tapering openings between the robotic arm and the guide arms allows cups to be acquired in a tapering opening as they both advance towards the cups). The robot head can move freely, independently of the positioning device, and the positioning device does not interfere with the operation of the robot arm, especially once the robot arm commences the positioning portion of its cycle—moving the teats to place these on the animal's udder.

Robotic Milking Arm with Integrated Guide Bars

Referring to FIGS. 25 to 28 an embodiment in which the guide arms are integrated with the robotic milking arm will be described. In this embodiment only one side of the robotic milking arm is shown but it will be appreciated that the guide bar arrangement is replicated on the other side so that a pair of guide bars are symmetrically arranged about the robotic arm.

Figure 25:
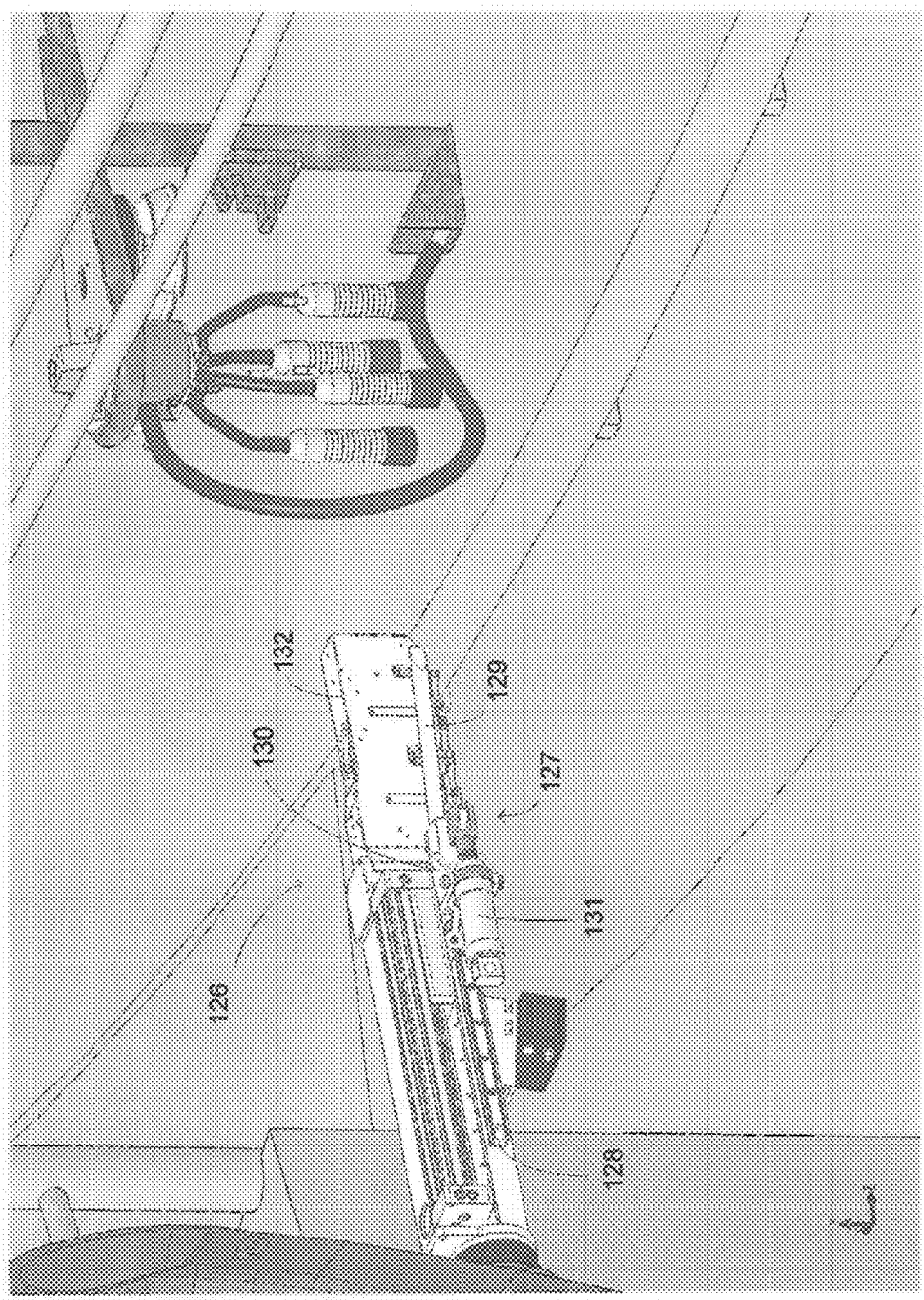
FIG. 25 shows a perspective view of a robotic milking arm with integrated guide bars shown in a radially diverging configuration.
Figure 26:
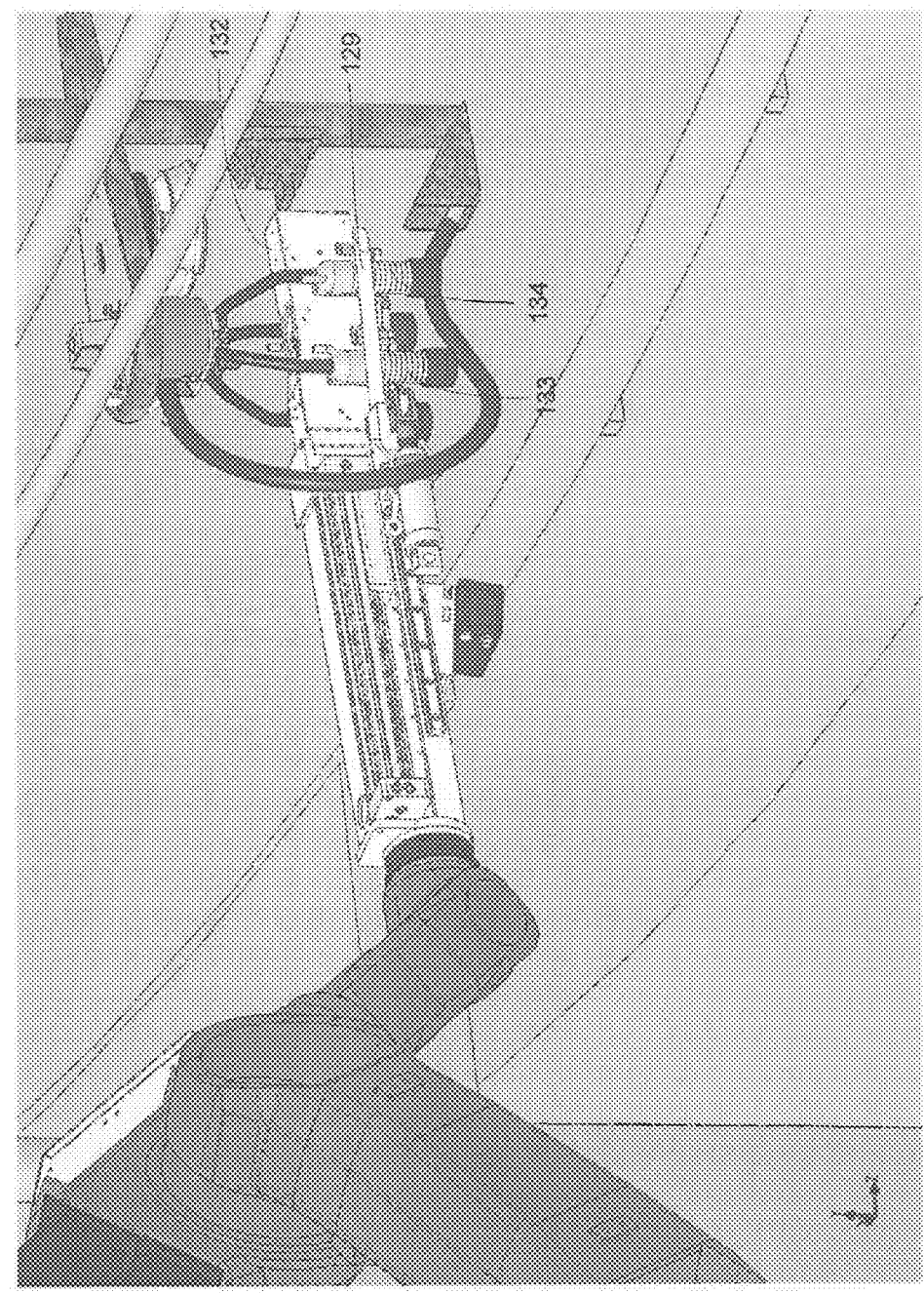
FIG. 26 shows a perspective view of the robotic milking arm shown in FIG. 25 when the robotic milking arm is advanced to capture milking cups.
Figure 27:
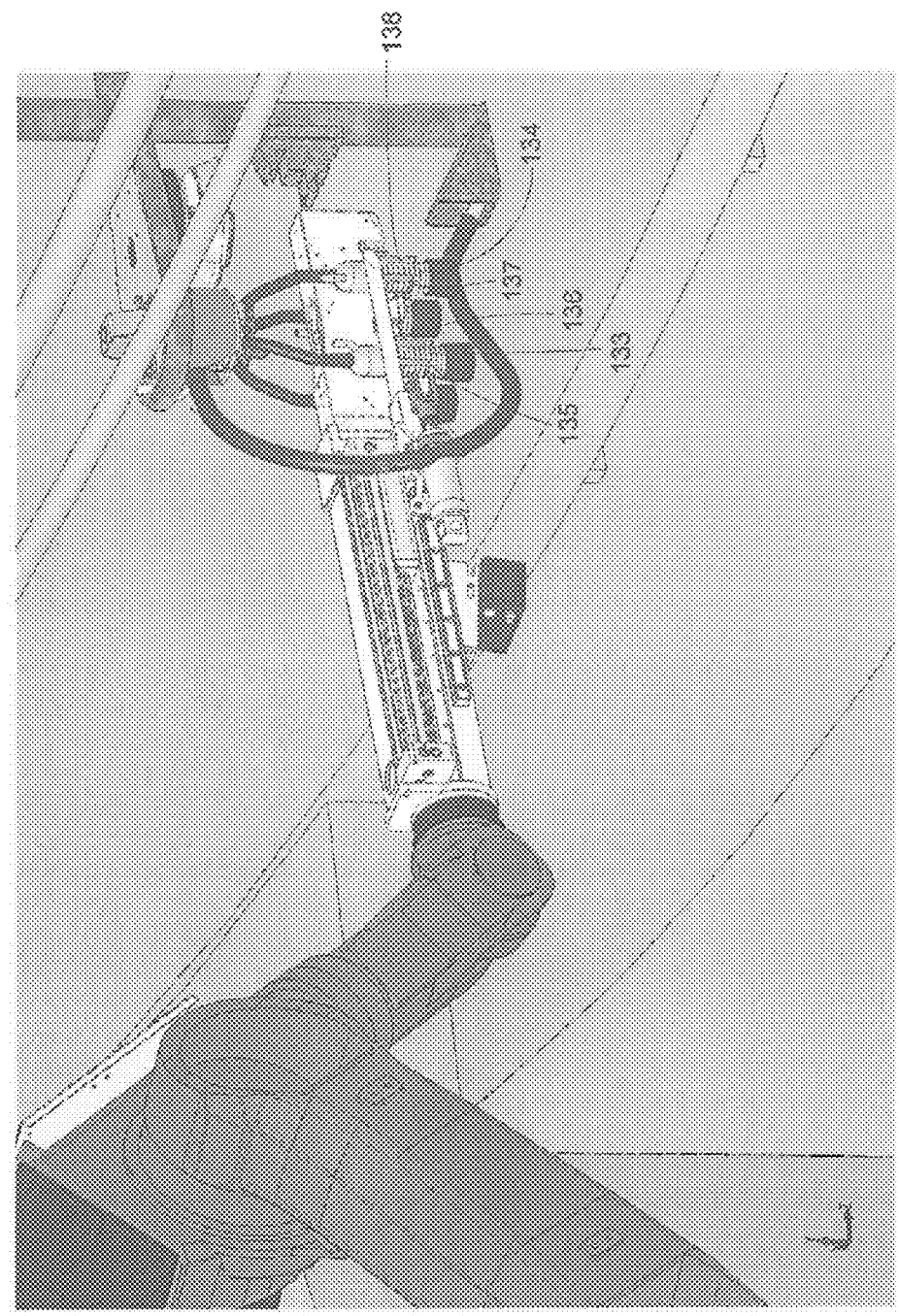
FIG. 27 shows a perspective view of the robotic milking arm shown in FIG. 25 when the guide arms are rotated towards the robotic milking arm to facilitate acquisition of the cups.

Robotic arm 126 is provided with a guide bar assembly 127 that can move along rail 128 from the forward position shown in FIG. 25 to the retracted position shown in FIG. 28. The guide bar assembly 127 includes a guide bar 129 pivotally mounted to a carriage 130 and an actuator 131 which can rotate the guide bar from an open radially diverging configuration for cup acquisition (FIGS. 25 and 26) to a closed configuration in which the guide bar 129 is generally parallel with the head 132 of robotic arm 126 (FIG. 27).

At the beginning of a cycle the guide bar assembly 127 is forward with the guide bar 129 in an open radially diverging configuration for ease of cup acquisition as shown in FIG. 25. The robotic arm 126 is then advanced as shown in FIG. 26 so that cups 133 and 134 are located within the radially tapering opening defined by head 132 and guide arm 129. The tapering opening assists in the easy location of cups 133 and 134 between head 132 and guide arm 129. Guide arm 129 is then rotated towards head 132 by actuator 131 until it is generally parallel with head 132 as shown in FIG. 27. Grippers 135 to 138 then grip the cups which are now closely contained against head 132 by guide arm 129. The guide arm assembly 127 is then retracted along rail 128 to the position shown in FIG. 28 with the cups ready to be applied to the teats of an animal by robotic arm 126.

This embodiment provides a simple integrated design requiring fewer elements and avoiding the need to coordinate relative movements between the robotic arm and guide arms.

The milking system of the present invention allows automation of a conventional multi-bale milking parlour using conventional milking clusters with a single robotic arm. The system allows all four cups of a standard milking cluster to be handled at once achieving high speed cup application. The system also allows conventional vacuum switching to be employed. The relative simplicity of the milking system makes it a robust and cost effective solution.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A robotic milking system comprising:
    a milking cluster having a plurality of cups connected to a bowl;
    a retractor to withdraw the cluster so that the cups hang down below the bowl;
    a robotic arm that is not permanently attached to the milking cluster having a plurality of grippers arranged to acquire and hold the plurality of cups of the cluster as they hang below the bowl and actuators for moving the arm to facilitate the attachment of the cups to an animal; and
    one or more guide arms positionable with respect to the robotic arm in a first configuration to define a radially tapering opening between the robotic arm and the guide arm to assist in locating cups within the tapering opening and positionable with respect to the robotic arm in a second configuration in which the cups are brought into closer proximity to the robotic arm for capture;
    wherein each guide arm guides a plurality of cups.

2. A robotic milking system as claimed in claim 1 including a pair of guide arms on either side of the robotic arm.

3. A robotic milking system as claimed in claim 2 wherein each guide arm is rotatable with respect to the robotic arm.

4. A robotic milking system as claimed in claim 1 wherein the one or more guide arms are mounted to the robotic arm.

5. A robotic milking system as claimed in claim 1 wherein one or more guide arms are moveable along the robotic arm from a position proximate the grippers to a position away from the grippers.

6. A robotic milking system as claimed in claim 1 including a guide assembly including a stand and a guide carriage moveably mounted on the stand, the arms mounted on the guide carriage.

7. A robotic milking system as claimed in claim 6 wherein the stand and guide carriage are mutually configured to allow the guide carriage to move tangentially in use.

8. A robotic milking system as claimed in claim 7 further comprising a guide track mounted between the guide carriage and stand, the guide carriage and guide track mutually configured to allow the guide carriage to move radially inwards and outwards on the guide track in use, the guide track and stand mutually configured to allow the guide track to move tangentially on the stand in use.

9. A robotic milking system as claimed in claim 6 wherein the cups are held by grippers on the robotic arm.

10. A robotic milking system as claimed in claim 9 wherein the grippers are in the form of a pair of opposed arms with the internal jaws shaped to grip a cup.

11. A robotic milking system as claimed in claim 10 wherein two pairs of grippers are provided back to back facing in opposing directions on a gripper portion of the robot arm, the gripper portion and guide mutually configured so that the gripper portion can just locate between the closed arms when the grippers on each side are closed.

12. A milking parlour as claimed in claim 11 wherein the robotic arm is arranged so as to operate through the rear legs of an animal when attaching cups, and wherein each milking cluster retracts to a generally known position upon release from an animal.

13. A milking cluster guide, comprising:
    a support assembly configured to rest on a surface and provide a support platform onto which items can be mounted;
    a positioning assembly mounted on the support assembly and configured to move on the support assembly both radially and tangentially; and
    a pair of arms mounted on the positioning assembly, the arms generally horizontally aligned and having at least an open position where the arms are positioned to taper radially so as to guide a plurality of cups within the tapered arms.

14. A milking cluster guide as claimed in claim 13 wherein each of the arms is pivotally connected to the positioning assembly at or close to an outer arm end, the pivotally connected ends adjacent, the arms configured to move between an open position where the arms taper radially, and a closed position where the arms are generally parallel.

15. A milking cluster guide as claimed in claim 14 wherein the positioning assembly comprises a guide track, the support assembly and guide track mutually configured to allow the arms to move radially inwards and outwards on the guide track in use.

16. A milking cluster guide as claimed in claim 15 wherein the positioning assembly further comprises a guide carriage mounted on the guide track, the guide arms mounted on the guide carriage, the guide carriage and guide track mutually configured to allow the guide carriage to move radially inwards and outwards on the guide track in use, the guide track and stand mutually configured to allow the guide track to move tangentially on the support assembly in use.

17. A robotic milking arm comprising:
a robotic arm having a plurality of grippers arranged to acquire and hold a plurality of cups of a milking cluster having actuators for moving the arm to facilitate the attachment of the cups to an animal; and
one or more guide arm positionable with respect to the robotic arm in a first configuration to define a radially tapering opening between the robotic arm and the guide arm to assist in locating cups within the tapering opening and positionable with respect to the robotic arm in a second configuration in which the cups are brought into closer proximity to the robotic arm for capture;
wherein each guide arm guides a plurality of cups.

18. A robotic milking arm as claimed in claim 17 including a pair of guide arms on either side of the robotic arm.

19. A robotic milking arm as claimed in claim 17 wherein each guide arm is rotatable with respect to the robotic arm.

20. A robotic milking arm as claimed in claim 17 wherein the robotic arm includes grippers to acquire the cups.

21. A robotic milking arm as claimed in claim 20 wherein one or more guide arms are moveable along the robotic arm from a position proximate the grippers to a position away from the grippers.

22. A method of positioning a milking cluster guide comprising the steps of:
positioning a plurality of grippers configured to grasp around the body of a teat cup through the centre of a cluster of teat cups hanging below an associated bowl;
moving a pair of arms inwards so that the arms are positioned around the outside of the cluster; and
moving the arms towards the centre of the cluster to push the teat cups into a position for engagement with the grippers.

* * * * *